(12) United States Patent
Sabadin

(10) Patent No.: US 10,368,504 B2
(45) Date of Patent: Aug. 6, 2019

(54) PROCESS AND SYSTEM FOR CONTROLLING MODULATION ASSISTED VALVES FOR THE INTERNET OF THINGS

(71) Applicant: Paul Francis Sabadin, Carlsbad, CA (US)

(72) Inventor: Paul Francis Sabadin, Carlsbad, CA (US)

(*) Notice: Subject to any disclaimer, the term of this patent is extended or adjusted under 35 U.S.C. 154(b) by 367 days.

(21) Appl. No.: 14/760,882

(22) PCT Filed: Feb. 10, 2014

(86) PCT No.: PCT/US2014/015641
§ 371 (c)(1),
(2) Date: Jul. 14, 2015

(87) PCT Pub. No.: WO2014/124400
PCT Pub. Date: Aug. 14, 2014

(65) Prior Publication Data
US 2015/0351337 A1    Dec. 10, 2015

Related U.S. Application Data

(60) Provisional application No. 61/762,703, filed on Feb. 8, 2013.

(51) Int. Cl.
| | | |
|---|---|---|
| A01G 25/16 | (2006.01) |
| B05B 1/30 | (2006.01) |
| B05B 15/70 | (2018.01) |
| B05B 15/74 | (2018.01) |
| F16K 31/04 | (2006.01) |
| G05B 19/042 | (2006.01) |

(52) U.S. Cl.
CPC ............ *A01G 25/16* (2013.01); *B05B 1/3026* (2013.01); *F16K 31/042* (2013.01); *G05B 19/0426* (2013.01); *B05B 15/70* (2018.02); *B05B 15/74* (2018.02); *G05B 2219/2625* (2013.01)

(58) Field of Classification Search
USPC ........................................................ 700/282
See application file for complete search history.

(56) References Cited

U.S. PATENT DOCUMENTS

| | | | | |
|---|---|---|---|---|
| 2,589,188 A | * | 3/1952 | De Craene | ............ F16K 31/088 251/340 |
| 3,134,404 A | * | 5/1964 | Ziccardi | .............. F16K 31/0682 137/625.31 |
| 3,726,477 A | * | 4/1973 | Shapiro | .................. A01G 25/16 239/70 |

(Continued)

*Primary Examiner* — Joshua E Rodden

(57) ABSTRACT

The invention includes a process and system for controlling a genus of valve, typically in a pipe network. The genus of valve is herein referred to as a modulation assisted valve (MAV). The process and system of controlling said MAV's comprises a multitude of embodiments of such MAV's as deployed in a plurality of network configurations of pipes, such networks of pipes further interconnected with means of modulating the fluid forces encountered by such MAV's so as to assist in the actuation of such MAV's. The coordinated modulation of fluid forces within embodiments of pipe networks enables MAV's that are connected in common with the same pipe network to be controlled and actuated with reduced electrical energy consumed by said MAV's.

12 Claims, 15 Drawing Sheets

(56) References Cited

U.S. PATENT DOCUMENTS

| | | | | |
|---|---|---|---|---|
| RE31,023 E * | 9/1982 | Hall, III | A01D 46/24 137/236.1 |
| 4,423,484 A * | 12/1983 | Hamilton | G05B 19/042 137/624.2 |
| 4,452,423 A * | 6/1984 | Beblavi | F16K 1/02 251/129.11 |
| 4,852,802 A * | 8/1989 | Iggulden | A01G 25/167 137/78.3 |
| 4,948,091 A * | 8/1990 | Satoh | F16K 1/12 251/129.11 |
| 5,048,755 A * | 9/1991 | Dodds | A01G 25/16 137/78.2 |
| 5,333,785 A * | 8/1994 | Dodds | A01G 25/16 239/67 |
| 7,406,363 B2 * | 7/2008 | Doering | A01G 25/162 700/282 |
| 7,631,813 B1 * | 12/2009 | Lichte | B05B 15/70 239/11 |
| 8,295,985 B2 * | 10/2012 | Crist | A01G 25/16 700/284 |
| 8,532,831 B2 * | 9/2013 | Crist | A01G 25/16 239/63 |
| 8,706,913 B2 * | 4/2014 | Doherty | A01G 25/167 709/201 |
| 8,793,024 B1 * | 7/2014 | Woytowitz | B05B 12/02 137/78.2 |
| 8,851,447 B2 * | 10/2014 | Crist | A01G 25/16 251/129.04 |
| 2002/0002425 A1 * | 1/2002 | Dossey | G01F 1/44 700/284 |
| 2003/0120393 A1 * | 6/2003 | Bailey | A01G 25/16 700/284 |
| 2009/0065606 A1 * | 3/2009 | Lee | A01G 25/16 239/67 |
| 2013/0320250 A1 * | 12/2013 | Graham | F16K 31/0675 251/129.04 |
| 2015/0226177 A1 * | 8/2015 | DeFrank | A01G 25/16 700/284 |

\* cited by examiner

Side View Muti-Port MAV     FIG. 16     Top View Orifice Wheel

ON/OFF STATES OF INDEPENDENT OUTLET PORTS WITH SHUTTLE-ROTOR SETTING

| Numbered angular position of shuttle-rotor | On/Off State of Outlet Port 1 | On/Off State of Outlet Port 2 | On/Off State of Outlet Port 3 | On/Off State of Outlet Port 4 |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

PROCESS AND SYSTEM FOR CONTROLLING MODULATION ASSISTED VALVES FOR THE INTERNET OF THINGS

This application claims priority to U.S. Provisional Application Ser. No. 61/762,703 filed on Feb. 8, 2013, and is incorporated herein in its entirety. The present invention relates to valve apparatuses and the process of their control in pipe networks.

BACKGROUND

Description of the Related Technology

Automated means of controlling valves as described by prior art are widely used and varied in their approach to delivering fluid to end users such as agricultural plants, fire sprinklers, or downstream industrial processes. Valves have typically been hardwired for power and control making valve installation and maintenance less convenient, more costly, and less mechanically robust while requiring sometimes difficult and unsightly routing of control and power cables. Also motivated by this hardwiring, prior technologies have evolved automated control solutions that favor controlling the delivery fluids to multiple fluid end demand points by the actuation of a single hard-wired valve. For example, the flow of fluid to a branch of many irrigation sprinklers is typically controlled by a single branch solenoid valve. Similarly, fluid delivery to individual fluid demand points in industrial, food production, or livestock or poultry watering is done en masse, regardless of the variation in fluid demand at individual delivery points.

The increased availability and low-cost of small, low-powered, wireless communications devices can make automated methods for controlling smaller valves for network branches (or even individual fluid end point demand) more realistic. Some valves have appeared that are powered by small batteries or by harvesting energy from the ambient environment (see, e.g. U.S. Pat. No. 8,055,389 B2). These valves typically use radios for communications and control. However, available energy sources are so small that precision remote valve control has evolved primarily to using either direct acting or piloted bi-stable solenoid valves, as those types of valves require only small amounts of actuation energy for only for a short period of time during a change of state (off to on, or vice versa). Bi-stable piloted and direct acting solenoid valves remain stable in either the "on" or "off" state without further use electrical power. This low power simplicity has further evolved fluid delivery systems that typically do only that: turn the fluid supply only on or off. Bi-stable piloted and direct acting solenoid valves, in fact, have other multiple disadvantages:

- They are bi-stable: That is, Bi-stable piloted and direct acting solenoid valves only can be used in an "on" or an "off" position.
- Clogging: Piloted bi-stable solenoid valves have small pilot holes that can clog with debris, especially in environment where the working fluid is other than pristine. And, for reasons discussed below, direct acting bi-stable solenoid valves have smaller orifices making them also subject to clogging with debris.
- Limited range of operating pressures: Piloted bi-stable solenoid valves typically require a minimum pressure to be actuated which is on the order of 2.5 pounds per square inch. Lower pressures (such as those found in gravity fed irrigation system, for example) experience unreliable valve operation. Assisted lift valves have help to solve this problem but at increased cost. Direct acting bi-stable solenoid valves can act down to zero or negative pressures but there is a cost to this attribute.
- Actuation forces/power: Because direct acting bi-stable solenoid valves require actuation forces proportional to their orifice area and the pressure of the working fluid, they required high forces (energy, and power) under pressure, and thus typically keep forces low by having small orifices.
- Flow volume: precisely due to the aforementioned low power and small orifice sizes typical of direct bi-stable solenoid valves, these valves typically can only control a limited flow of fluid before significantly more actuation power is required.
- Cost/Complexity: Bi-stable piloted solenoid valves are somewhat complex due to their precision diaphragms, which add to cost.

So, the development of ultra-low-power valve technologies is an area of challenge that exists for the practical deployment of wireless precision-controlled fluid delivery systems that also work well with other developing technologies such as low powered radios, low powered microcontrollers and that are low cost and have compact form factors. Devices that enable simple retrofitting of existing hydraulic installations and devices that are simple and rugged would also be attractive.

One type of valve that is actuated with zero electrical power is in common use and is shown in U.S. Pat. No. 6,220,293 B1. It is an indexing valve that uses only the modulation of fluid pressure in the irrigation feed-line to actuate the valve through a sequence of multiple settings. However, this is something of a "dumb" valve. Index valves do not coordinate fluid power with electrical power, nor do they use electronic communications or control between the indexing mechanism and any external electronic controller by any means, even by wire. They simply move through a sequence of settings without variation. There is no ability to change the predetermined sequence of valve actuations. However, it does hint at a way in which the hydraulic power inherent in an irrigation line might be used in synergy with modern electronic control techniques and technologies such as microcontrollers, RF communications, and energy harvesting hardware.

Various innovations have also reduced many of the costs associated with autonomous valve maintenance such as replacing chemical batteries with capacitor energy storage, such as is done in the DIG patent (U.S. Pat. No. 8,055,389 B2). Still, this references none other than the old standby bi-stable solenoid valve.

Other innovations have reduced costs associated with power generation and use in energy autonomous valves. Along these lines, ultra-low powered microcontroller technologies have greatly reduced control power requirements. Ultra-low powered transceivers for radio frequency and other physical media means of communication have greatly reduced the communications power and cost requirements of such valves. Similar improvements in solar cell and other technologies have increased efficiencies and reduced the cost of power generation hardware for autonomous valves. However, the cost of the valve mechanism itself remains high relative to the overall cost of an autonomous valve. In California Department of Food and Agriculture final report CDFA-FREP #03-0655, Precision Fertigation in Orchards in Development of a Spatially Variable Microsprinkler System, the authors state:

"When this project was conceived, we did not anticipate the difficulty of valve selection. There is very little availability of simple, robust, and low cost valves. Since valves are a critical part of this system, commercial efforts to improve valve design are needed. As part of a summer internship in our laboratory, a student researched valve technology and developed an alternative design to those available commercially. Similar efforts by large companies could result in a small, rugged, and inexpensive valve. Spatially variable control of individual trees in an orchard would demand millions of units and this could be a potent driving force for innovation and commercialization."

Multiple public disclosures by persons involved in the art (such as Coates et al in California Department of Food and Agriculture final report CDFA-FREP #03-0655, Precision Fertigation in Orchards or in US 20120273587 A1 or in U.S. Pat. No. 8,055,389 B2) have continued to cite only the use of general valves, electronic valves, or "solenoid valves" with either implicit or explicit assumption of constant pressure or flow being imposed upon such valves at the time of actuation.

Still, only traditional and well known valves types are being retrofitted with microcontrollers and energy harvesting modules such as solar charging systems. In these retrofits that convert traditional to autonomous valves, the fundamental valve types that are being used have remained essentially unchanged. Few recent process or apparatus innovations can be identified for increasing the efficiency of energy delivery or consumption for the physical actuation of autonomously powered valves. Older valve designs and control processes persist.

In electrically actuated autonomous valves, the actuation energy required significantly influences energy harvesting needs. The energy storage capacity, copper winding mass, and the current carrying capacity of valve actuation drive circuitry have significant negative impact on device cost. Clearly, improved processes and apparatuses for reducing actuation energies can reduce each of these costs and significantly reduce the overall cost of autonomous valves.

In contrast to controlling a multitude of irrigation outlets with a single valve, precision irrigation is instead concerned more with individually controlling a multitude of valves that supply water to individual or small groups of plants or trees. It is further desirable that precision irrigation systems reliably operate where outlet pressures may vary from very small values (such as is found in gravity fed irrigation systems) to the standard high pressure outputs of pumps and municipal water supplies. Clearly it would be beneficial to design valves and processes of valve control that more appropriately manage this multitude of flows as is desired in a precision irrigation and other fluid delivery systems. It would also be particularly valuable for the cost of such a multitude of valves to be minimized, resulting in more financially competitive precision irrigation systems.

Electrical and electronic energy are both efficient and convenient means of control and power. The control of incompressible fluids under pressure has long been used as efficient means for transmitting power. It would be advantageous to employ a process and system that leverages both the fluid power inherent in fluid delivery systems with control and microelectronic technologies to reduce the forces and energies required to actuate valves thus making their employment in precision fluid delivery systems more attractive. By doing this, less costly valves with smaller, less expensive, electromechanical actuators and tinier, less expensive magnets, miniscule amounts of copper wire windings, and miniscule amounts of magnetic materials can be realized.

Aspects and embodiments of the present invention combine, in a novel way, many of the latest technologies with old technologies and reduce to practice a useful major component of practical precision radio controlled fluid delivery systems.

Embodiments of the present invention can have streamlined form factors that enable it to be easily applied as a retrofit with conventional hydraulic devices (e.g. sprinklers, and other devices) thus creating the potential for immediate use and positive impact on residential irrigation, agricultural water and fluid delivery, industrial fluid delivery based industries and other applications.

Certain aspects of the present invention show further advantages. As can be seen in the description of elements of some embodiments of this invention, stepper-motor technology, sometimes with the magnetic rotors being essentially sealed within the valve conduit) can make up the electromechanical motor of some embodiments of modulation assisted valves (MAV's). These embodiments with sealed stepper motor rotors can be free of valve packings, stems, or other high friction elements, which thus further enable them to be actuated with little friction and small amounts of energy. Some of these MAV embodiments also exhibit multi-stable states or settings. That is, some embodiments, as will be seen, can be used to throttle fluid flow to multiple discrete flow settings while also having extremely low actuation energies. This is very advantageous and very unlike prior art bi-stable solenoid valves which only have two settings: "on" and "off."

SUMMARY OF EMBODIMENTS

In one aspect, a system for controlling a modulation assisted valve includes a modulation assisted valve (MAV) interconnected and in fluid communication with means of controlling and modulating the flow of fluid or pressure across the MAV. A modulation assisted valve is a genus apparatus that is used in coordination with means of modulating the pressure imposed across said MAV so that the modulation of fluid forces acting on said MAV results in reduced electrical energy being consumed in the actuation or setting of said MAV. The reduced individual valve actuation energies resulting from a system for controlling a modulation assisted valve enables a multitude of different MAV genus embodiments, several of which are described herein, that can perform useful fluid delivery tasks such as low energy proportional valve control, compact multi-ported valve outlets, and other useful functions. Embodiments of the present invention further enable useful integrations of such systems and valves into such systems as networks of multitudes of modulation-assisted, energy harvesting and energy-autonomous, wirelessly controlled, and electric capacitance provisioned valves.

BRIEF DESCRIPTION OF THE DRAWINGS

FIG. 16 shows a view of a multi-port modulation assisted valve.

DETAILED DESCRIPTION OF CERTAIN EMBODIMENTS

Description—System Embodiment for Controlling an MAV—FIG. 1-FIGS. 5A and 5B

Figure 1:
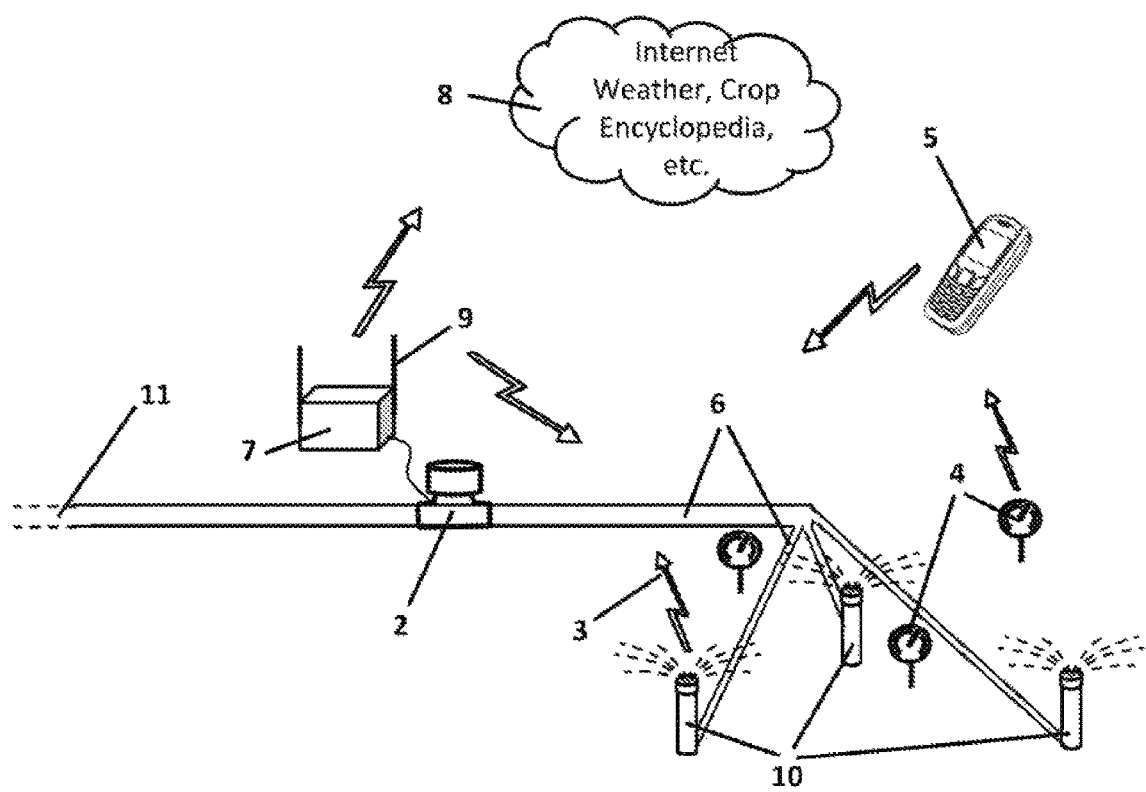
FIG. 1 is a simple context diagram for a system and process for controlling a modulation assisted valve (MAV).

FIG. 1 shows one system embodiment for controlling a modulation assisted valve (MAV) and is intended primarily for setting context by showing one embodiment of the present invention. The figure shows a globally distributed irrigation management system that is able to control the actuation of sprinklers and other irrigation devices through various communications means where the final communications link is a wireless radio link at a valve of the type described herein. The figure also shows the use of a wide area network of wireless and wired communications links including cellular telephone links with Short Message Service (SMS), digital comm links with satellites, Wi-Fi, low power and low data rate personal area networks such as that described herein and gateways between the various local and wide area networks and communications technologies. The figure also shows interconnection with the Internet. Control of the system through web-enabled cell phones is shown as is the wireless enablement of agricultural sensors for physical measurements including moisture, pH, and other environmental parameters. The figure shows the use of publicly or privately available real-time weather data as well as digital connection to crop management encyclopedias which can be used to digitally optimize the management of agricultural production. The figure shows the association of geographic position data for each sprinkler and, potentially, each sensor whereby that data may be used by the system to better manage agricultural production in a variety of ways, including simple mapping of sensed parameters, water delivery locations and quantities, problem reports at geographic locations, and many other, higher level, processes that can be employed to optimize the economy of agricultural production.

Figure 2:
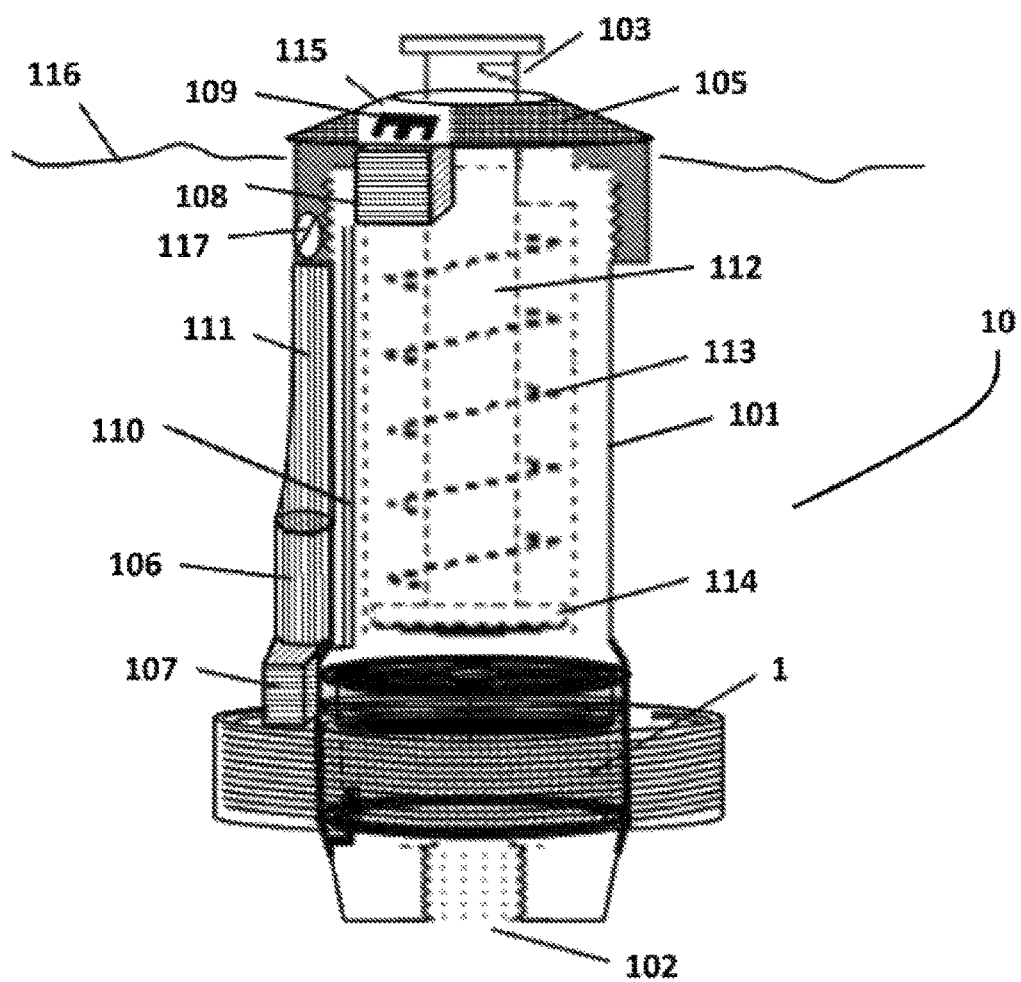
FIG. 2 shows a combination embodiment of an energy harvesting electronic irrigation valve in combination with one embodiment of a modulation assisted valve.
Figure 3:
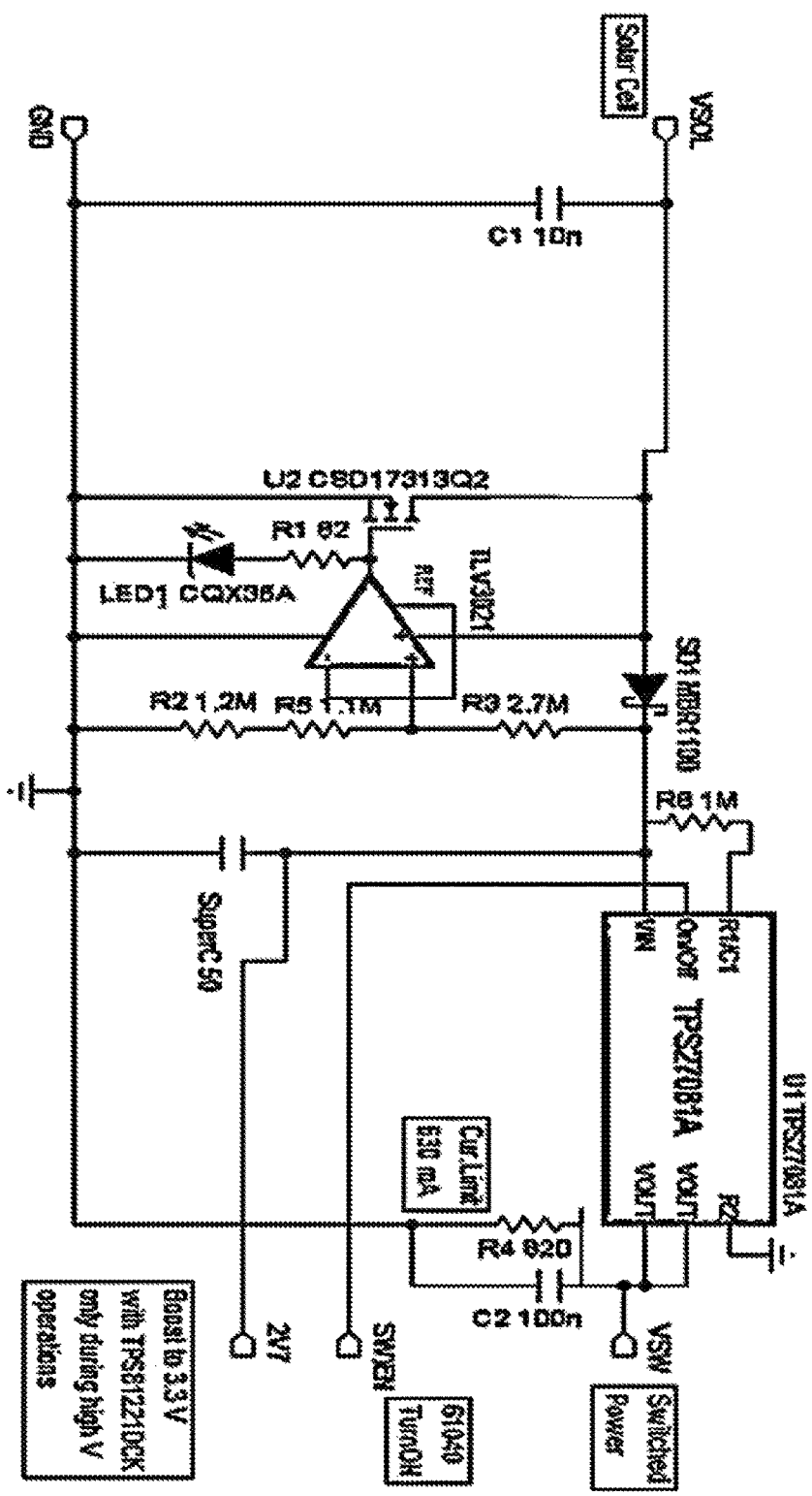
FIG. 3 shows an electronic schematic of a solar power management circuit of an energy harvesting modulation assisted valve (MAV).

FIG. 2 shows an energy harvesting electronic irrigation valve and emitter comprised of a solar cell, a microcontroller, a super capacitor for storing solar energy, a radio transceiver and an embodiment of an element of the apparatus of the present invention when integrated with a familiar popup sprinkler head. The entire device is shown in its partially buried position with respect to ground level 116. The overall structure is comprised of an embodiment of a an apparatus that we will call a modulation assisted valve (MAV) 1 and a popup sprinkler having a water inlet port 102, a moveable sprinkler riser 112, and a plastic spray nozzle 103. The device has a conventional riser piston 114 that raises the riser 112 when water pressure is introduced at inlet 102, and has a return spring 113 that draws riser 112 back into the sprinkler body when the water pressure is removed. Each of the preceding are straight forward and well known in prior art, except for the condition that spray nozzle 103 is best made entirely from plastic or other dielectric material. Dielectric nozzle material is desired so as to serve the functionality of other more novel attributes of the device which are to be discussed.

The figures show the use of an embodiment of a modulation assisted valve 1 in combination with other apparatuses. Element 1 in FIG. 2 shows a step throttling MAV which is the first embodiment of one element of the invention further disclosed in this document. Detailed description of the step throttling modulation assisted valve 1 can be had below. The energy harvesting modulation assisted valve apparatus of FIG. 2 comprises a hydraulic endpoint device (here a sprinkler head), and other elements, with an embodiment of a primary element of the present invention: a modulation assisted valve (MAV). Different configurations of an energy harvesting valve could use different embodiments of MAV for item 1 of the figure.

The top of the apparatus shown in FIG. 2 (shown exposed above ground level 116) in the region where a top deck would typically appear for a standard popup sprinkler, is covered with a photovoltaic array of one or more solar cells 105. The solar cells provide power for the entire device and are used as the source of electric charge and voltage that is stored in a super capacitor or lithium-ion capacitor power store 106. Solar cells 105 are encased or covered with a light-transparent epoxy, or similar, coating that protects the cells from the elements while still transmitting most optical energy that falls on the device through to the surface of the photo-cells. The area of solar cells 105 is interrupted by a "keep-out" region 115 that has no solar cell or metallic material. In the middle of the "keep-out" region is a flat metallic printed circuit board radio frequency (RF) antenna 109. The "keep-out" region is restricted to non-metallic elements so as to allow clear operation of the RF antenna 109.

The entire device is intended to allow, for example, a lawn mower to be passed over it without damage, thus motivating a very low position for the RF antenna 109. However, the antenna 109 may be required to be raised above the photovoltaic array 105 so as to avoid RF interference with the solar cell material or to enable its protrusion into clear space for interference-free communication. An electromagnetic antenna simulation may be required to optimize antenna geometry and positioning as compared the expressed and preferred position described. An ancillary monopole antenna that protrudes above ground level may be connected in lieu of flat PCB antenna 109 where improved communications are required and installation permits.

Just beneath the antenna 109 in FIG. 2 is a radio frequency transceiver circuit 108 and ancillary electronics. The transceiver circuit 108 is potted or enclosed in the molded material of the sprinkler body or other material so as to isolate it from weather and other damaging elements. RF transceiver 108 is, for this embodiment, based on Microchip Corporation's MRF24J40, MRF89XA, or other transceiver integrated circuit for implementing low data rate wireless personal area networks (WPANs). The antenna geometry 109 would need to be appropriate for the chosen transceiver frequency. The transceiver circuit 108 has an included metallic ground plane integrated with it so as to act as a counterpoise to antenna 109.

Figure 5A:
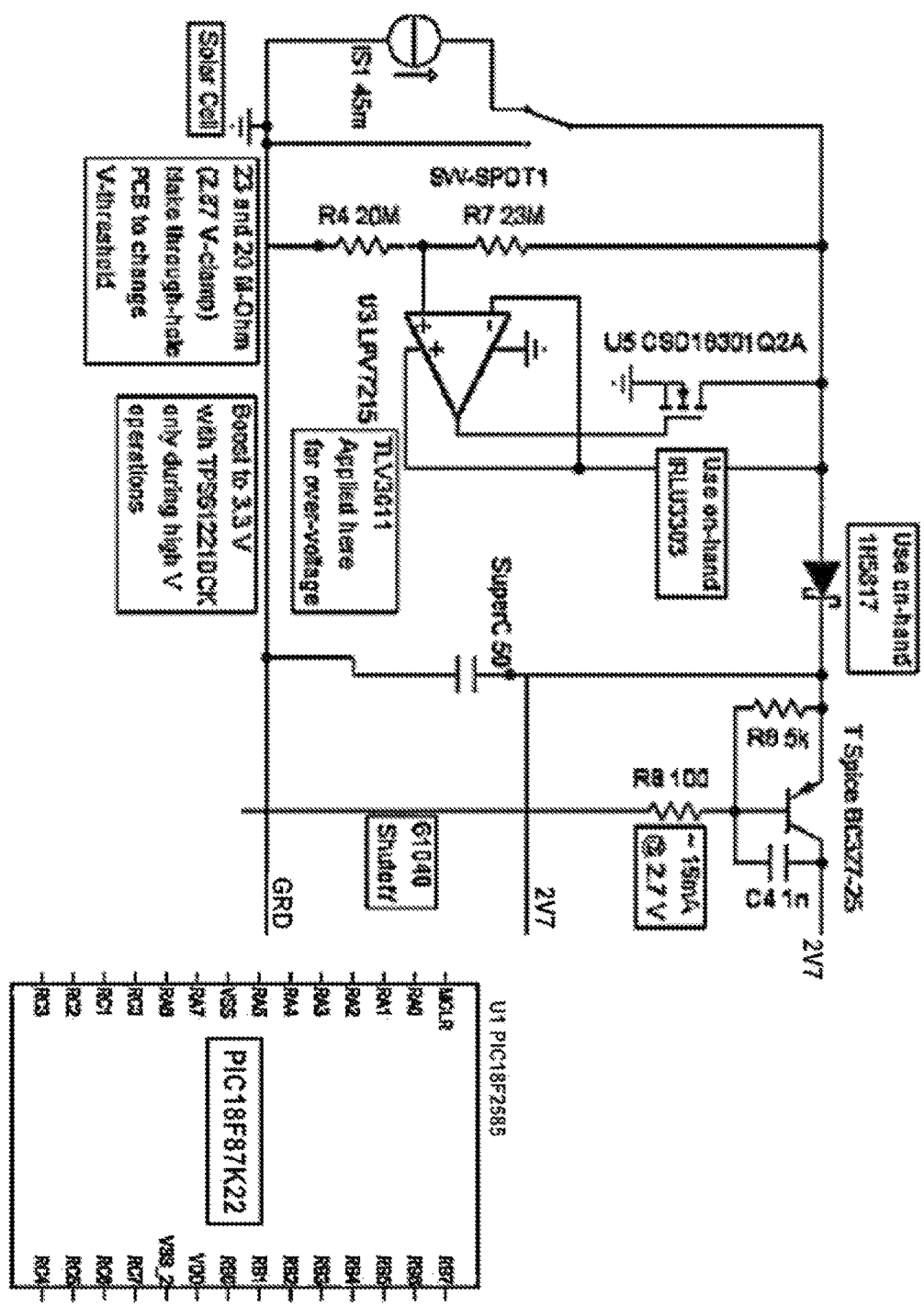
FIGS. 5A and 5B show respective halves of a high level electronic schematic of for an energy harvesting modulation assisted valve.
Figure 5B:
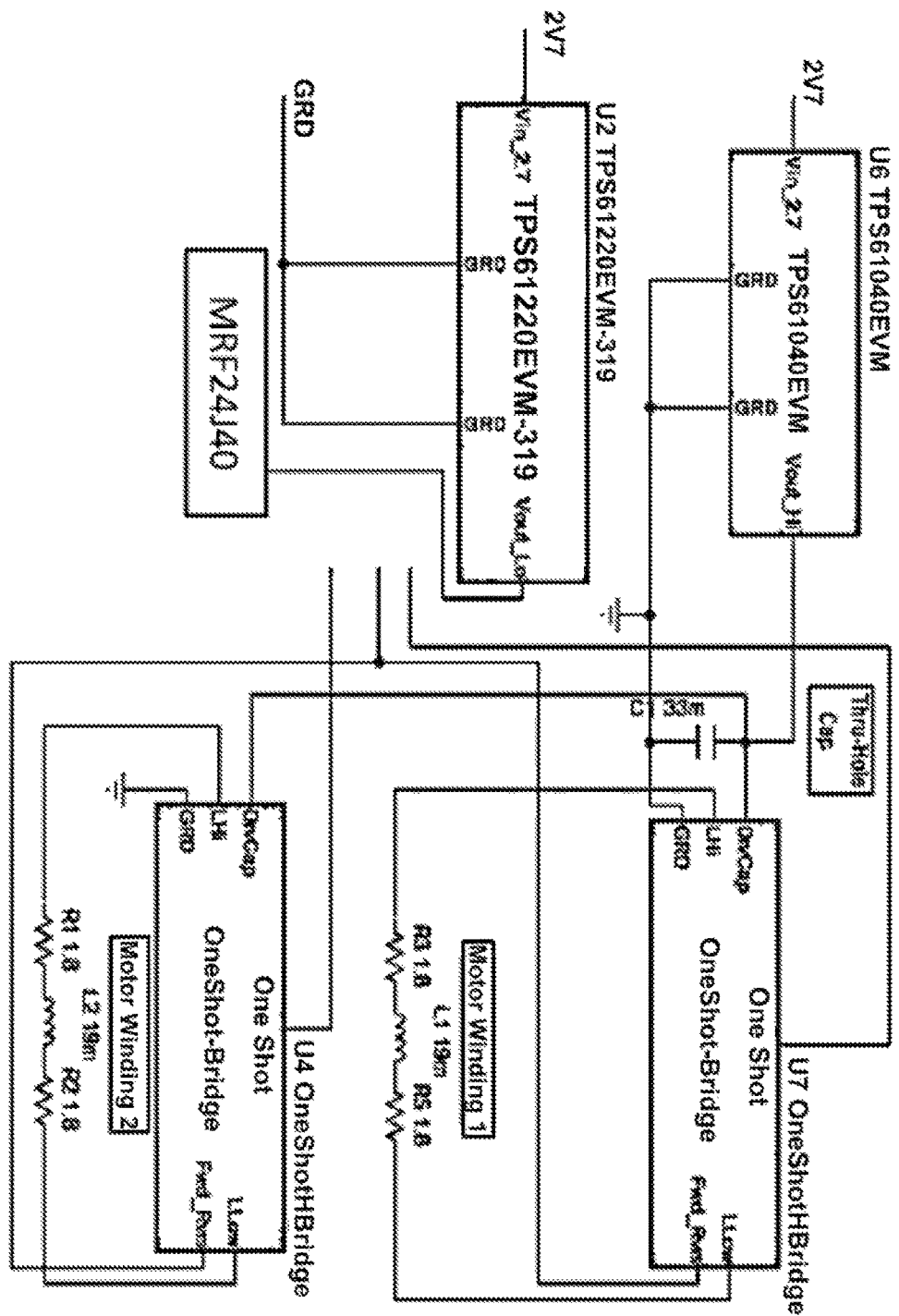

FIGS. 5A and 5B show the overall layout of an embodiment's electronic circuitry in a prototype form. The solar input and voltage protection is at the left of FIG. 5A. Two boost transformers, the TPS61040 and the TPS61220, convert super capacitor or lithium-ion capacitor power from a typical 2.7 volts to 16 volts (to drive the stepper motor of the valve) and 3.3 volts (to drive the radio transceiver), respectively. The other components are as described in this document. In FIG. 5A the bipolar transistor at the top of the page should be replaced with the TPS27081 power switch shown in FIG. 3.

FIG. 2 further shows the inclusion of a super capacitor or lithium-ion capacitor power storage device 106 that, like the transceiver circuit 108, is also encapsulated and shielded from the elements by enclosing material 111. The super capacitor or lithium-ion capacitor power source is comprised of one or more super capacitors or lithium-ion capacitors and potentially some simple balancing electronics for maintaining equivalent voltages on similar capacitors where multiple super capacitors are employed. A single super capacitor is expected to suffice for the device's power storage needs. A battery is currently anticipated not to be used as super capacitors will provide virtually indefinite length, rugged, highly reliable, and extremely low maintenance rechargeable power storage that should meet all power requirements for the device. The super capacitor 106 may be placed in a different physical location than shown to enable optimal filtering of transient electrical current surges associated with turning off and on device electronic sub circuits. A super capacitor over-charge protection circuit is included with the super capacitor 106 to guard against over-charge from the solar cells 105 on bright or long daylight days. The over-charge protection circuit is shown as essentially the left half of FIG. 3. In that figure the comparator has an internal voltage reference which is used to create a comparator trigger point, with hysteresis, and disallows the 50 farad super capacitor from charging to greater than 2.7 volts. The TPS27081 is a power switch, which drives a boost converter (not shown) to convert the capacitor's 2.7 volts to nominally 16 volts to drive power waveforms with the power MOSFET stepper motor half-bridge drive circuit of FIG. 4. This boost circuit may need to be charged and "fired" multiple times over to energize successive steps of the stepper-motor.

In FIG. 2, a microcontroller chip and power management electronics package 107 are electrically connected and near to super capacitor 106 and transceiver 108. Calculations show that power consumption is dominated by the current used to run the microcontroller during its expected long periods of sleep. For this reason, the microcontroller 107 expected to be employed with an embodiment of the present invention is Microchip Corporation's PIC18F87K22. The PIC18F87K22 is an extremely low power microcontroller that consumes approximately 20 nA of current in its low voltage sleep mode. The PIC microcontroller also has a real-time clock and calendar peripheral device. A sufficiently highly accurate electronic resonator is included with the electronics package 107 so as to enable sufficiently accurate operation of the microcontroller's clock-calendar function and for scheduling wakeup, sleep, transmission of message times, and reception of message times. The microcontroller in electronics package 107 also has many input/output pins, several of which are programmed to control the current waveform for driving modulation assisted valve 1. It has 128 kilobytes of program memory, 1 k byte of EEPROM, and a real-time clock/calendar.

The ancillary electronics in electronics package 107 also include two voltage boost circuits. One boost circuit converts the nominal 2.7 (or lower) volts of super capacitor 106 to approximately 3.3 volts so as to power transceiver 108 and the other boosts the voltage from the super capacitor 2.7 volts to as high as 25 volts to efficiently supply power for actuation of modulation assisted valve 1.

Figure 4:
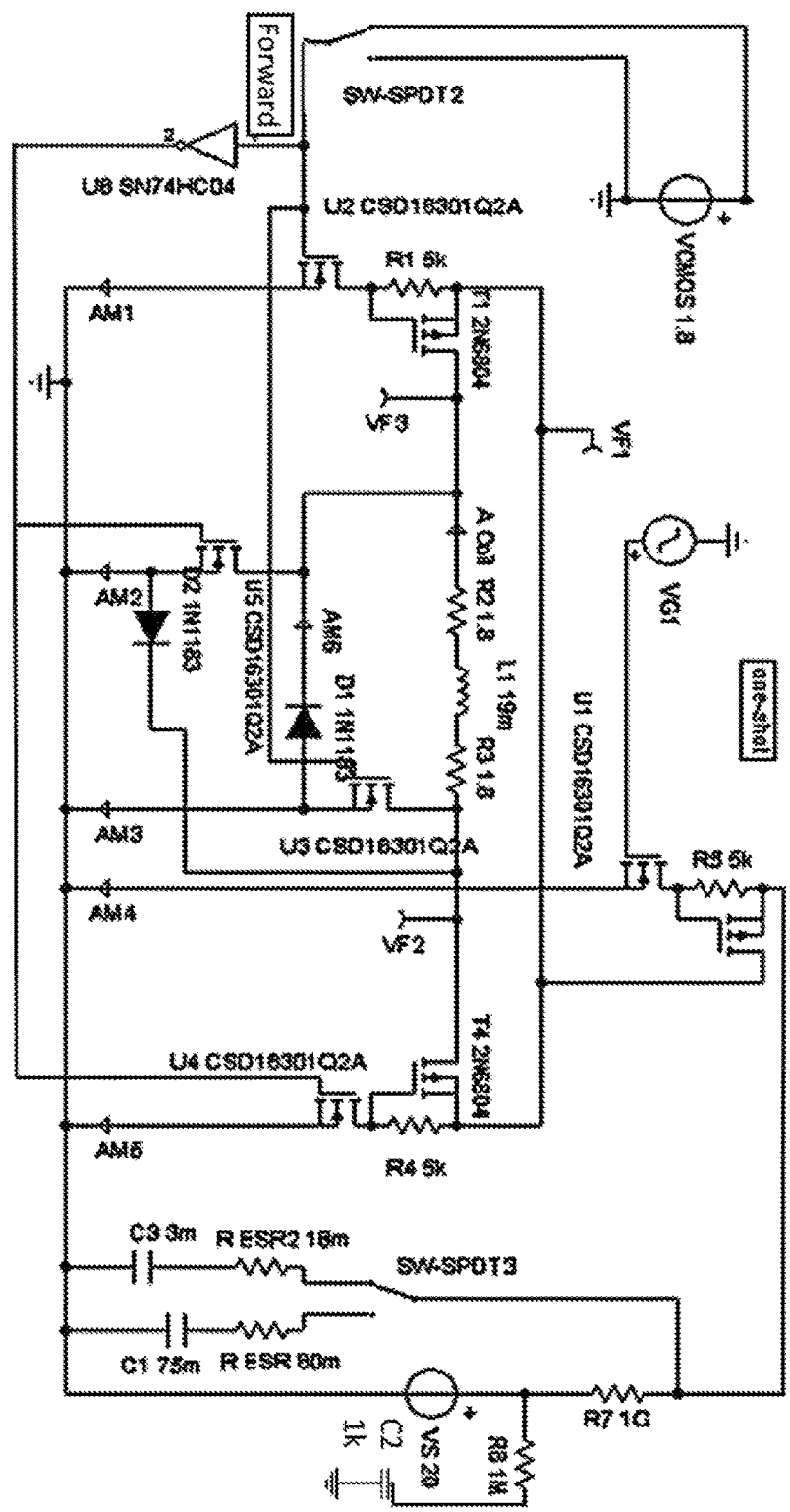
FIG. 4 shows an electronic schematic of a valve actuation power circuit for an energy harvesting modulation assisted valve.

Electronics package 107 also includes valve motor power buffer electronics to allow the microcontroller in electronics package 107, which is on a low voltage circuit, to control the higher voltage current waveforms necessary to drive the modulation assisted valve 1. A circuit that is efficient and sufficient for this buffering is shown in FIG. 4.

The PIC18F87K22 microcontroller chip of electronics package 107 controls and communicates with the RF transceiver chip 108 by interconnection with a serial peripheral interface (SPI) bus in which the microcontroller is master and the RF chip is a slave.

A current-limited universal serial bus (USB) device port protected by a screw-on weather cap 117 rests in the side of the valve body. The USB device port is connected to the microcontroller through wiring harness 111 and ancillary electronics.

Item 111 in FIG. 2 is a general purpose wiring harness that interconnects the microcontroller and ancillary electronics 107, the RF transceiver, 108, and a device USB port.

A wireless personal area network (WPAN) protocol software stack makes up part of the firmware for the device and is expected to be a sort of beacon network so as to enable very short wake/sleep duty cycles for purposes of conserving operational power.

Operation—of Embodiment of an Energy Harvesting MAV—FIG. 2

Referring to FIG. 2, solar cells 105 supply current which is then stored in super capacitor 106. Calculations show that no chemical battery is required for the device if it is operated with attention to the power resources available. With little or no power conditioning, super capacitor 106 is expected to directly power the electronics package 107, including the microcontroller which can operate on as little as 1.8 volts. The 25 voltage booster previously mentioned as part of 107, is used to efficiently supply power for the current waveforms for mechanical actuation of valve embodiment 1.

The combination shown, which we may call an energy harvesting modulation assisted valve with an embodied element (valve apparatus) of the present invention is expected to be physically installed nearly as any other hydraulic device such as a sprinkler head. The entire device is set in place and inlet port 102 is attached to a water supply. The present embodiment is physically best oriented such as to optimize antenna 109 gain (reception and transmission)

by pointing it in the direction of any external wireless devices with which the present embodiment is to communicate.

It is expected that the super capacitor or lithium-ion capacitor 106 of the device will, at installation, possess zero charge. Therefore, the device is designed to be connected to an external host USB device (such as a smart phone or tablet computer) through USB port 117 in FIG. 2. Super capacitor 106 in that figure will then begin to be charged by the host USB power source up to a point where it reaches is maximum allowed voltage (currently expected to be 2.7 volts). Alternatively, the device may be initially charged from solar cell 105, but the amount of time required for capacitor 106 to reach full charge will be much longer. In either case, after initial setup, solar cell 105 will continue to charge energy store 106 which, in turn, will supply all energy required to operate the device. Other embodiments of this valve may include small water-turbine generators mounted in the valve flow path, or similar, in place of solar cell 105 from which to harvest the energy necessary for device operation.

During the initialization charging process, after capacitor 106 reaches a predetermined threshold voltage as seen by microcontroller 107, the microcontroller executes behavioral steps encoded in its firmware program memory. An outline of that program follows:

Most typically, the device will be initially charged and logically initialized by means of interacting with a computer program in a USB-connected, Geographic Positioning System enabled (GPS-enabled), portable device such as a smart phone or portable computer. The connected program will load and update any new operating firmware into the sprinkler microcontroller and perform some basic initialization functions. Importantly, as part of the initialization process, GPS coordinates will be downloaded from the portable computer to the firmware in the sprinkler valve to enable the precise geolocation of the device. The device will most probably store the downloaded geographic coordinates into its non-volatile memory so that they can be later recalled by the device for local operation or sent to an external controller when commanded over the wireless link.

The execution of microcontroller firmware begins with the reset/initialization firmware program. After basic microcontroller hardware configuration, the firmware program utilizes a predetermined underlying public or custom wireless protocol (such as Zigbee or a custom protocol) to negotiate connection to and join with an IEEE 802.15.4 (or similar) based wireless personal area network (WPAN). The device then publishes its ability to communicate over the network. A wired connection could also be used.

The device may be commanded by a remote, external, device over the wireless communications channel, over a wired communications channel, or it even may be commanded over a collocated electrical connections (such as an SPI bus with interrupt line 111) by a control processor that is collocated with the current embodiment.

As the device harvests such a small amount of energy from its environment, its logical and physical operation is primarily defined in terms of small, low energy, discrete events and state changes. When the device is not executing one of these small events or while it is not managing or actuating one of the small state changes, the device will remain in a low-power sleep state. It is expected to be in this sleep state most of the time, again, for the purpose of conserving energy.

Commands sent by the external controller are in the form of commanded discrete events that change the physical and/or logical state of the present embodiment. Commands are managed by an internal event queue which stores command events in an essentially time-stamp-ordered sequence such that the oldest time-stamp command is executed first and the most recent time-stamp command is moved to the back of the queue to be executed later. Exceptions to this time-ordered queuing exist such as when the device encounters an error condition (e.g. low power, or similar) where internally generated events may be serviced before externally commanded events.

Messages may be sent and received by the device over said wireless or wired communications channel, to:
request (transmit) that commands be sent by the external controller
receive commands to synchronize device internal clock/timer with a commanded time stamp
receive commands to report execution status of previous commands and events
transmit status reports of previously executed commands and events
receive commands to cancel or modify previous commands
receive commands to enable alerts or exceptional conditions
receive commands to schedule wireless communications slot times for accepting future commands from outside the system, including
   receive scheduling commands for zero or more start times for said communications slots
   receive scheduling commands for termination of communications time slots
receive commands to schedule zero or more "set valve" events, the parameters of such commands taking the form of
   time for each of said "set valve" event,
   valve flow rate setting for said "set valve" event
receive commands to schedule zero or more "set sleep state" events, the parameters of such commands taking the form of
   time for each of said "set sleep state" event
   state indicator for each said "set sleep state" event A sequence of multiple command events may also be wrapped in a single, parent, command.

The flow rate parameter for said "set valve" event command would typically be a quasi-continuous integer value that was defined by the external commanding entity. A lookup table would convert the commanded flow rate parameter effectively to a fractional value between 0.0 and 1.0 (or equivalently 0 and 100 percent) corresponding to a fully closed and fully open valve. The reason for the lookup table would be to allow the valve to operate more uniformly when connected to widely varying downstream piping and fluid orifices (e.g. sprinkler heads vs pipe manifolds). The default lookup table would be a direct interpretation of the commanded flow rate parameter, but the commanding application could configure the present embodiment with different lookup values at installation time.

The state indicator parameter for said "set sleep state" event command would include such state indicators as "sleeping", "awake", and "idle." Sleep states, too, could be customized by the external commanding application protocol.

The allocation and synchronization of time slots for communications is common in various wireless networks and are often described as beacon networks.

After receiving commands from the controlling device, the present combination would then synchronize its clock-calendar with said commanded time stamp. It would then store all command events and their parameters, including scheduled communications intervals into on-board non-volatile memory, and store all of above said commanded scheduled "set valve" events commands into on board non-volatile memory. Other commanded events would also be stored in memory and ordered in the command event queue.

The present embodiment would then internally schedule "set valve" event times for each of said commanded "set valve" events and would do similar for communications time-slot intervals. If the current time was within one of the commanded communications time slots or was near in time to one of said "set valve" events, it would remain in the awake state and execute such "set valve" event command or communication command.

Commands received by the present embodiment are essentially commands for the device to change its state. Thus, the present embodiment has several essential states (though other, intermediate, ancillary or "housekeeping" states such as "idle" might also be used). Each defined state may be independent, dependent (sub-state), and/or combined with other states. In summary, the currently envisioned states comprise such states as follows. Indentations connote sub-states of a parent state:
- Awake State
- Communicating
- Receiving commands
- Transmitting status
- Not communicating
- Actuating valve
- Valve percent open
- Other states
- Other transient states (sometimes classified as events which move device from one state to next)
- Sleep state
- Not communicating
- Valve percent open
- Other states Events that are primarily scheduled by external commands (as discussed above) serve to transition the device from one compound state to another.

Execution of "Set Time" Command

The present embodiment would respond to the "set time" command by re-setting its internal clock to the commanded time stamp Execution of "Set Valve" Command The following outlines the logical steps for the present combination of elements to execute the externally commanded "set valve" command. For the physical means of actuation the modulation assisted valve (1 of FIG. 2), see the specification in this document for an embodiment of the reference modulation assisted valve 1.

To execute the commanded "set valve" event, the microcontroller in this embodiment would first schedule a "wakeup" event at the commanded "set valve" event time and wake up from its low power sleep state at such time by means of a timed microcontroller interrupt. It would read the present state value for the valve setting (amount open) stored in non-volatile memory and, if different from the commanded value, would actuate MAV 1 to the flow rate setting parameter of the current "set valve" event. It would then store the new valve setting in non-volatile memory as a part of the device's currently defined state.

Then, upon pressure being introduced by an external controller at valve inlet port 102, water would flow through the hydraulic device and out of the nozzle 103 at a rate dependent on the setting of valve 1.

For the "set valve" command to be reliably executed by valve 1, a means of commanding the modulation of fluid pressure imposed across valve 1, such as valve controller 7, could be invoked, resulting in the closing of valve 2 and a change of fluid flow or pressure being imposed across valve 1. The resulting change in fluid forces acting on valve 1 could then assist valve 1 in being actuated in coordinated execution of the "set valve" command. Thus no fluid pressure would exist at fluid inlet port 102 at the moment of physical actuation of valve 1, thus assisting the actuation of valve 1 by reduction of such pressure upon its gating mechanism (its valve member). Any kind of valve could be used in place of valve 2 as a means of modulating the pressure or flow of fluids imposed across valve 1, the point being to externally modulate or control the fluid forces acting on valve 1 to assist in its physical actuation. After setting the valve, the microcontroller would then schedule the next commanded event (which would typically be an event to turn off the valve (set the valve to zero flow), leave its flow setting unchanged (identical), or to schedule a wireless transmission request event to schedule a dialog with the controller, or other event). What type of event is next scheduled is, for the most part, externally commanded by virtue of the previously commanded event command messages. The device would then put itself into the power-saving "sleep" state, awaiting a sleep interrupt at the time of the next scheduled command event.

Execution of Other Commands

Other externally commanded events are primarily for the purpose of communicating with the external controller. Definition for the exact process of executing commands such as negotiating communications channels, scheduling communications time slots with the external controller, or reporting device status are primarily the role and responsibility of the external controller and such communications protocols are typically considered to be made up of elements defined in prior art. Still, the lower layers (in an ISO sense) of this inferred device/controller communications protocol will be much motivated by the constraints imposed by the limited energy that can be harvested by the illustrated combination of elements in its deployed environment. And, as the role of the combination of elements within a larger system is largely limited to harvesting energy, standing by awaiting further commands from a controller, and efficiently executing such commands to actuate MAV 1 in FIG. 2. The precise definition of a command and communications protocol is deferred to such controller.

Other housekeeping events such as re-positioning the valve to its absolute start position may also be exercised independently from the external controller.

Manufacture of the present combination embodiment would be by means commonly known by persons skilled in the art and would most likely involve creation of the valve body 110 by plastic injection molding, and standard mounting and physical encapsulation/protection of the photovoltaic array, antenna, super capacitor, microcontroller, and other electronics. MAV 1 could be later attached by glue, integral molding, pipe threading/screwing, or other some such conventional means.

Description of Other Combinations of Elements of this Energy Harvesting Modulation Assisted Valve Other combination of elements could include other irrigation devices that are similar to but have, for instance, a fixed sprinkler riser tube (rather than the moveable popup riser), different embodiments of MAV (item 1 in), and even very small embodiments using micro-motors to modulate the flow volume in tiny irrigation drip emitters. Other embodiments might integrate the discussed combination of elements with a poultry watering nozzle, an intermediate control valve at some branch of a hydraulic circuit, or as an intermediate or terminal device in a fluid delivery system for a food production or other industrial process.

The valve actuator for an embodiment of a non-modulation assisted energy harvesting valve might instead be a conventional magnetically latching bi-stable solenoid valve, or other valve that could be operated under pressure.

Description—First MAV Embodiment—FIG. 6-FIG. 9

Figure 6:
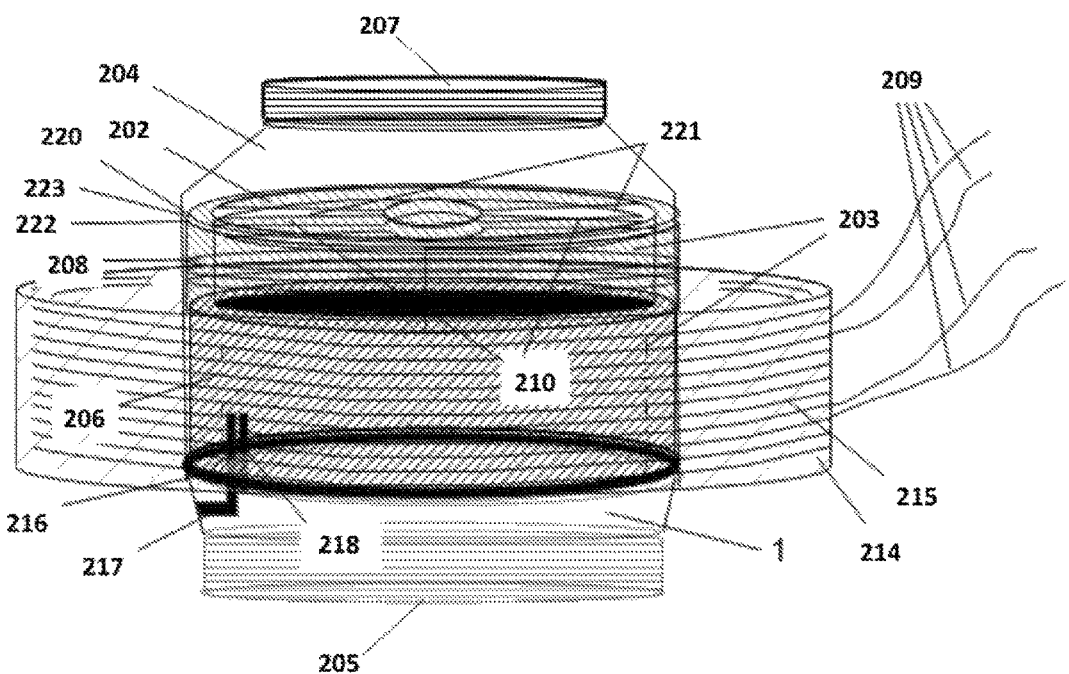
FIG. 6 shows an overview drawing of a step throttling embodiment of a modulation assisted valve (MAV).

FIG. 6 is a perspective side view of a first embodiment of a modulation assisted valve (MAV). We might call this embodiment a step throttling MAV. The entire step throttling MAV device 1 is essentially axially symmetric except for a few minor attributes such as motor lead wires 209. It has a fluid inlet 205, and a fluid outlet 207.

There are two parts of the step throttling MAV that move with respect to one another: the shuttle-rotor 203, which acts as a gating mechanism for obstructing fluid flow, and the valve body conduit 204. The valve body conduit, 204 is expected to be made primarily of injection molded PVC, ABS, or other common plastic material.

The shuttle-rotor 203 is completely submersed in the working fluid (wet rotor) and is hermetically sealed from other electromagnetic components of the device. The shuttle-rotor 203 includes, but is not limited in constitution to, a hollow cylindrical permanent magnet rotor 206 and an attached hollow cylindrical shuttle cap 208. The permanent magnet rotor 206 is of the type found in permanent magnet stepper motors such as those motors made by Portescap and commonly known as "can stack" permanent magnet motors. The hollow cylindrical center of the magnet rotor 206 is intended as a channel through which the working fluid may flow. The magnet is magnetized with a plurality of alternating north and south poles (behaving in the role of magnetic gate teeth) around its circumference. Of particular note is that the magnet rotor is actually enclosed within the conduit of the valve and exposed to the working fluid. As the rotor is exposed to the working fluid, the material composition of the magnet rotor 206 is typically ferrite, which is both common and corrosion resistant, but may be made from other materials. Other materials (such as neodymium or iron (reluctance motor)) would typically need to be coated or be implicitly resistant to the corrosive action of the working fluid. The magnet may, as is common in the art, also have other soft magnetic materials distributed in predetermined geometries about its surface (not illustrated) to increase the efficiency of motor magnetic circuits. At one end of its cylindrical shape, the magnet rotor 206 has fixed to it, a cylindrical shuttle cap 208. The shuttle cap 208 material is typically comprised of a non-corrosive plastic but may prove more effective if comprised with other ferromagnetic materials that increase electromagnetic efficiency or improve an axial solenoid action of the shuttle-rotor. Other non-ferromagnetic materials may also be used. Enclosing the magnet rotor 206 in the valve's conduit (and exposing it to the working fluid) constitutes a means of arranging the electromagnetic valve motor by which the step throttling MAV greatly reduces valve actuation forces by the elimination of a valve stem and associated packing (particularly eliminating the friction that is associated with a valve packing).

The rotor head 202 portion of the shuttle cap 208 is a layer of rigid, impervious plastic or similar material that is rigidly attached to the shuttle cap. The rotor head 202 is fenestrated with one or more segmented openings or orifices, herein referred to as rotor gates 210, in the head that span a prescribed shape with respect to their angular and radial extent. The purpose of said rotor gates 210 is to enable fluid flow through the rotor head 202. A finite annular ring of impervious material exists on the outer circumference of the rotor head 202 so as to enable the formation of a seal against a valve body seal 220. When no fluid pressure is applied to the valve inlet port 205, the rotor is at rest and a small gap 222 exists between the cap and the valve body seal 220 such that the entire shuttle-rotor may rotate inside of the shuttle body conduit 204 with minimal friction.

The valve body conduit 204 comprises, but is not limited in constitution to, the main valve body conduit structure 204, an attached ferromagnetic can-stack stepper-motor stator 214 containing magnet wire windings 215, winding lead wires 209 (the lead wires being a means of accepting electrical energy), a low-friction thrust ring 216 upon which the magnet rotor 206 rests (under zero fluid pressure), a fixed planar valve body seal 220 spanning the entire outlet except for having one or more segmented openings or orifices of prescribed shape with respect to their angular and radial extent called body gate modulation orifices 221. Adjustable overlap of body gate modulation orifices 221 with rotor gates 210 in the top of the rotor shuttle cap 208 is the means by which the valve modulates fluid flow volume. A few small additional openings (not illustrated) may appear in the body seal 220, but are not matched in the rotor head 202, are anticipated to be unnecessary. The purpose of inclusion of said ancillary openings is, if proven necessary, to ensure a definite pressure seal of rotor head 202 to body seal 220 under pressurized operation of step throttling MAV 1. Pipe threading is shown in the drawing at the inlet 205 and outlet 207 of the valve, but is ancillary, or not necessary, as fixing the valve to external piping may entail various means of fastening including PVC pipe glue, integral molding into another device or other means. Gasket material 223 is typically applied to the underside (bottom) of the body seal 220 surface, except in regions of the body gate modulation orifices 221 and, potentially, in regions of ancillary holes within the body seal 220. A reset stop 217 is attached to the valve body conduit 204 and protrudes up into the hollow cylinder of the shuttle-rotor 203. A rotor stop 218 is attached to the inside cylinder wall of the shuttle rotor 203. The reset stop 217 and rotor stop 218 exist for the purpose of enabling rotation of the shuttle-rotor 203 to its reset, or zero degree, absolute position.

The can-stack stator 214 may be integrated with the body conduit by various means. During the manufacturing process, the entire stator 214 and windings assembly 215 might be completely encased with a molten thermoplastic block of larger dimension than the stator assembly itself.

After the plastic solidifies, the block may be drilled through the interior cylindrical part of the stator 214 with a precision drill, thus forming the cylinder in which shuttle-rotor 203 resides while also forming the main body conduit 4 of the step throttling MAV. Further adjustment of the bore diameter might further use an abrasive removal of some material with emery or sandpaper fixed to a drill or manually applied so as to create a tight tolerance magnetic gap between magnet rotor 206 and stator 214. Both ends of the cylindrical hole 205 to 207 may be tapped with female threads, the shuttle-rotor 203 inserted into the cylinder, and each of two male threaded pipes could then be threaded into either side of the body conduit cylinder 204. One of these pipes could have the body seal 220 with body gate modulation orifices 221 applied to the end and the other pipe could have the thrust ring 216 attached at its end.

Another means of manufacturing could include expansion heating the stator/winding assembly (214, 215) and then to slide it over a cool, thin-walled plastic pipe, the latter of which would form the inlet 205 and outlet 207 ports of the valve body conduit 204. Glue could be used to fix the stator 214 to the cylindrical valve body conduit pipe 204. Body seal 220 and gates 221 could then be glue-inserted into one end of the body conduit cylinder 204 and thrust ring 216 could be similarly glue-inserted into the other end of body conduit cylinder 204.

Centrifugal molding techniques could also be used, wherein the pre-assembled stator 214 and lead wires 209 are placed into a mold and spun to create a cylindrical pipe body conduit 204, of which the stator/windings assembly (214/215) is an integral part.

Regardless of the means of attachment, the stator 214 and valve body conduit 204, in this step throttling MAV, integrally form the valve conduit cylinder in which magnet rotor 206 turns. The envisioned thin layer of material between stator and rotor is thick enough to withstand leakage of the pressurized working fluid into the stator 214 yet is as thin as possible to minimize the reluctance of the magnetic path between the stator 214 and the magnet rotor 206. It is also thin enough to enable the free rotation of the shuttle-rotor 203 with minimal frictional resistance. The four magnet wire leads 209 shown in FIG. 6 act as a means of accepting electrical energy in response to commands sent to do so by an attached means of accepting such command signals, such as a radio receiver. The four wire leads, 209, imply a two-phase bipolar stepping configuration, but other phase and polarity motor configurations, such as are common in the art of electric motors, may be alternatively employed. A return coil spring may prove useful if attached at one end to the bottom of the shuttle-rotor 203 and at the other end to the valve body conduit 204 near the inlet port 205, but is anticipated to be unnecessary. Instead, passive magnetic forces and/or gravity are expected to hold shuttle-rotor 203 to its rest position against the thrust ring 216.

Figure 7:
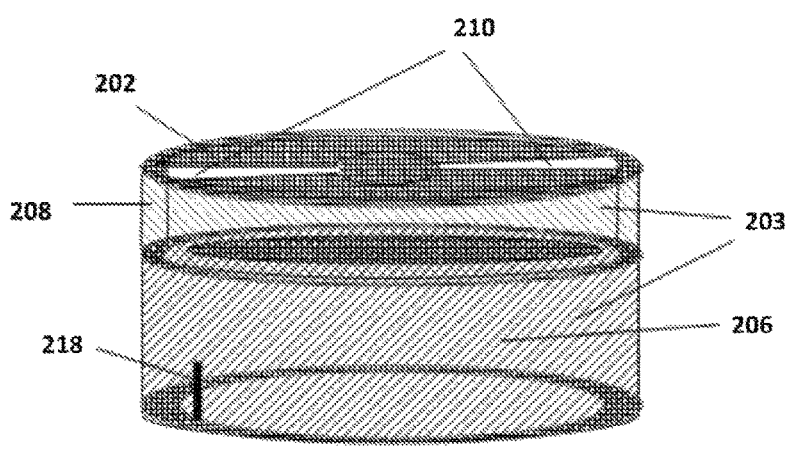
FIG. 7 shows a shuttle rotor assembly of a step throttling MAV.

FIG. 7 shows a perspective side view of the step throttling MAV shuttle-rotor assembly 203, isolated from the valve body conduit (FIG. 6, #204), and shows the physical structure of this fluid gating mechanism. The shuttle-rotor assembly 203 has two cylindrical parts: the stepper magnet rotor 206 and the impervious shuttle cap 208. In this step throttling MAV, a conventional stepper-motor magnet rotor is used, which is a hollow cylindrical ring-magnet that is permanently magnetized with a plurality of alternating north and south poles (gate teeth) around its circumference. Its material composition is typically ferrite, but other hard magnetic materials, or soft magnetic materials (in the case where a variable reluctance stepper or other motor is employed) may be used. Appropriate corrosion resistance of the rotor materials is potentially applied to magnet rotor 206 which is more important in the case where magnet rotor 206 is not made of ferrite (a very stable compound). In yet other step throttling MAVs, the rotor may also take the form used in hybrid stepper motors that employ permanent magnets and soft magnetic materials as a primary means of rotor construction. The magnet rotor structure may, as is common in the art, also have other soft magnetic materials fixed around the magnet to increase the efficiency of magnetic circuits. An essential novelty of the invention is that the magnetic rotor 206 is completely surrounded by the working fluid, and isolated from the stator 214 by such fluid. This means enclosing electric motor parts within the working fluid minimizes actuation friction by obviating the need for valve stems and high friction seals or packings. In FIG. 7, the shuttle cap 208 is integrally attached (by epoxy glue or similar means) to the magnet rotor 206 and rotates, synchronously, with it. FIG. 7 again shows the closed shuttle rotor head 202 surface with segmented orifice openings or rotor gates 210, through which fluid may flow. Other than the rotor gate openings 10, the rotor cap has a flat, planar, top surface which forms a seal (or partial seal, that acts as a gating mechanism to fluid flow, dependent on the shuttle-rotor 203 rotational angle setting with respect to the body gate modulation orifices FIG. 8, #221) with the body seal gasket (FIG. 6, #223) when the valve is exposed to a working fluid pressure. The rotor shuttle cap 208 is made of a plastic such as PVC or ABS, and is epoxied to the magnet rotor 206. However, shuttle cap materials other than PVC may prove more manufacturable or rugged and means other than epoxy might be used to fasten the shuttle cap 208 to the magnet rotor 206. The rotor stop 218 is shown attached to the hollow interior of the shuttle-rotor 203.

Figure 8:
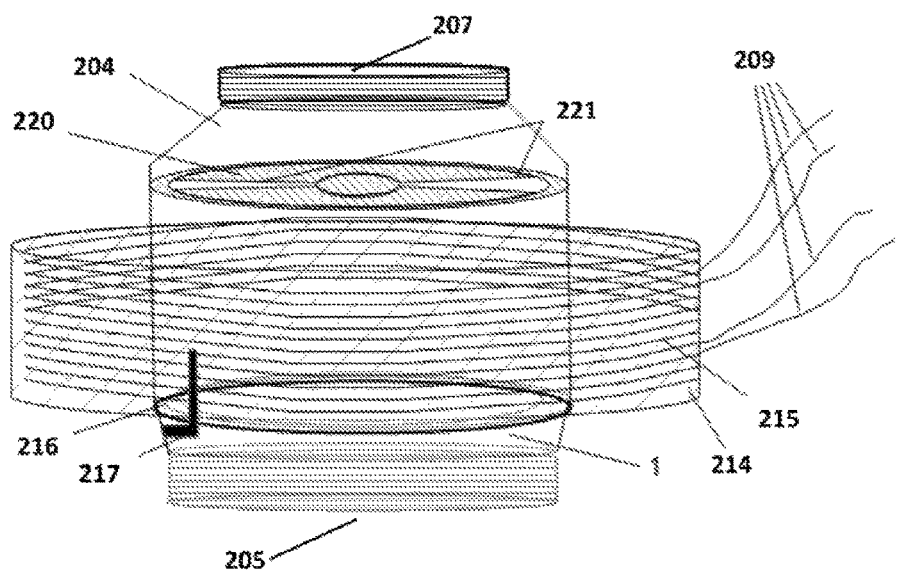
FIG. 8 shows a valve body assembly (without shuttle-rotor assembly) of a step throttling MAV.

FIG. 8 shows a perspective side view of the valve body conduit 204, isolated from the shuttle-rotor assembly (FIG. 7). The fluid input and output ports are again shown by 205 and 207, respectively. Surrounding the cylinder of the main valve body conduit 204, is shown the ferrous metal can-stack stepper motor stator 214, inside of which are wound the magnet wire windings 215. The stator 214 and windings 215 are isolated from the interior of the valve body conduit 204 by a thin-wall layer of plastic (or other non-ferrous) valve cylinder material which acts as the air-gap of the can-stack stepper motor. Leads 209, which are used as a means of accepting electrical energy, are shown connected to the magnet wire windings 215 through the stator 214, by which the coils can be energized. A low-friction thrust ring 216 of PTFE or similar material is fixed in the bore of the valve cylinder upon which the shuttle-rotor assembly (FIG. 7 #203) rests and can be rotated with minimal applied torque. Fixed just outside the stator 214 region of the valve in the direction of the outlet port 207 is a planar seal 220 spanning the entire outlet port area 207 except for having one or more segmented openings or orifices called body gate modulation orifices 221 that are intended to work with and overlap the rotor gates (FIG. 2 #210). The reset stop 217 is shown attached to the inside of the valve body conduit and protruding into the center of same.

Figure 9:
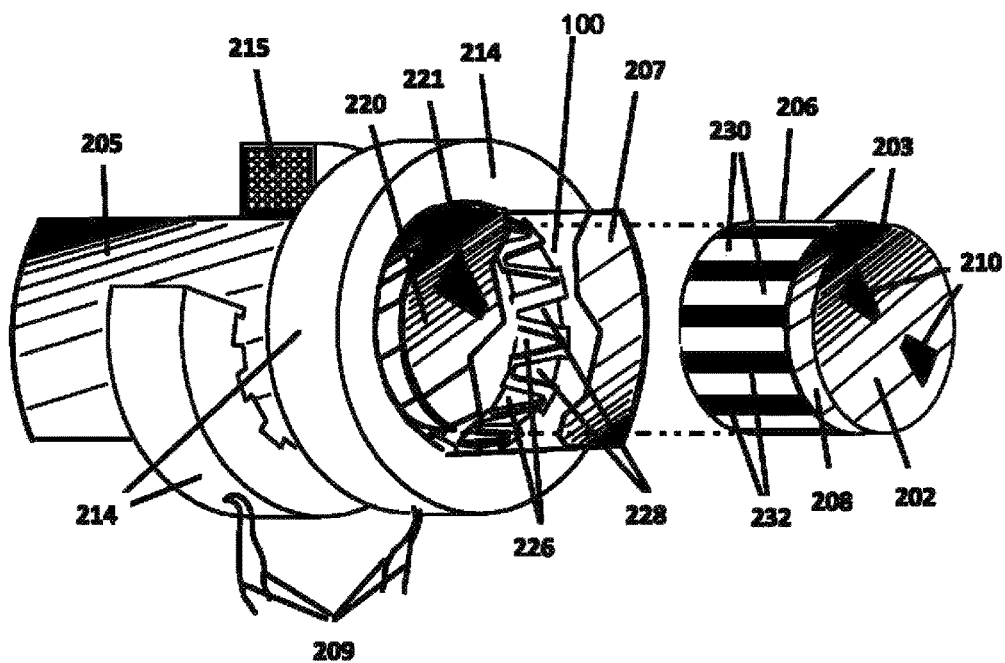
FIG. 9 shows a hybrid exploded/cutaway view of a step throttling MAV.

FIG. 9 illustrates the step throttling MAV in a hybrid exploded/cutaway perspective view. In this view, the relation of the parts to one another, particularly the placement of the shuttle-rotor assembly 203 with respect to all other parts is exaggerated and moved so as to aid in description of the device. This view also shows some attributes that are not literally visible on the physical device such as the magnetization state 230 and 232 (north or south magnetic poles, or gate teeth) of regions of the magnet rotor 206. Again, the step throttling MAV combines new novel features and applications with existing stepper motor technology, the latter of which are well described in writings of prior art and industry, and will not be described herein. FIG. 9 again shows piping for the inlet port 205 of the valve and a cutaway portion of the pipe for the outlet port 207. These pipe cylinders, in this step throttling MAV, are made of non-ferromagnetic material such as PVC plastic. The shuttle-rotor assembly 203 is shown exaggerated from its normal position in the working valve. The hollow cylindrical magnet rotor 206 is shown with explicit regions of alternating north 230 and south 232 poles (gate teeth) along its circumference. In this step throttling MAV, the magnet rotor 206 is made primarily of ferrite material with the addition of some surface ferromagnetic material to aid in the definition of efficient magnetic circuits. The rotor shuttle cap 208 is again shown with its rigid impervious head 202, in which, two segments for rotor gate orifices 210 are opened. The entire shuttle cap 208 is fixed to the magnet rotor 206 by means of epoxy glue or similar. In the working device, the shuttle-rotor assembly 203 is situated centered inside of the stator phases 214 and sealed from them by a thin layer of non-ferromagnetic "air gap" PVC plastic or other material. This shuttle-rotor assembly 203 is situated on the inlet side of the valve body seal 220, and acts as a gating mechanism for fluid flow through the valve. Two stepper motor stator phases 214 are also shown with the outlet port pipe 207 shown in cutaway (reference numeral 100 is simply a "cutaway" drawing window) to reveal north 226 and south 228 stepper motor stator "teeth" which are preferentially attract magnet poles 230 and 232 (gate teeth), and provide a torque to the shuttle-rotor 203 that is dependent on the electrical energization polarity of the stator magnet wire windings 215 current. The figure also shows the valve body seal 220 with body gate openings 221 that are intended to complement the size and shape of the rotor gates 210. The size and shape of the combined gates 210 and 221 may be mathematically optimized to best work with downstream orifices (external from the step throttling MAV) so as, for example, to affect a linear pressure relationship or linear flow rate relationship with shuttle-rotor angular setting. The inlet side of the body seal 220 may or may not be covered with a gasket (FIG. 6 #223) to aid in sealing the valve under applied fluid pressure. Not shown in FIG. 9 is the thrust ring (FIG. 8 #216), upon which the magnet rotor 206 rests when the valve is under zero differential pressure applied between inlet and outlet. At rest (zero pressure) a small gap (FIG. 6 #222) exists between the shuttle rotor head 202 and the valve body seal 220, and the entire shuttle-rotor assembly 203 rests in place against the thrust ring (FIG. 6 #216) only under the forces of gravity and small residual magnetic forces. The at-rest rotational position of the shuttle-rotor assembly 203 is stable and at rest in any one of several discrete angles (gate positions) defined by the magnet rotor 206 poles (gate teeth) distribution 230 and 232 and the resultant magnetic "cogging" with the stator teeth 226 and 228. Wire leads 209 act as a means of accepting electrical energy and enable the stator windings 215 to be energized with electric current.

Operation—First MAV Embodiment—FIG. 6-FIG. 9

The step throttling MAV 1 in FIG. 6 is connected to a fluid supply such as a residential sprinkler supply pipe at its inlet port 205. Typically, the valve will be oriented vertically as shown in FIG. 6 with inlet port 205 beneath outlet port 207. As there is no valve stem or packing, the dominant force which must be overcome to actuate the valve is the frictional force encountered in rotating shuttle-rotor 206. To minimize this force, valve actuation takes place by controlling inlet pressure such that zero pressure between inlet and outlet ports is applied, whereby shuttle-rotor 203 is free to move without shuttle cap 202 being pushed by fluid pressure against body seal 220. Winding leads 209 act as a means of accepting electrical energy and are connected to an external electrical power source such as an electrically buffered battery or super capacitor or lithium-ion capacitor, and will be switched on and off by logic, typically managed by the firmware of an embedded microprocessor or microcontroller (not shown). The step throttling MAV may, however, be powered and controlled by any means practical.

Outlet port 207 will be connected to a useful device, most typically an irrigation outlet (such as a garden sprinkler) or a branch in a piping circuit.

At rest, no electric current exists in the motor windings 209 and fluid pressure is controlled such that no fluid pressure or flow exists between valve inlet 205 and outlet ports 207. In this state, the magnet rotor 206 rests on the body thrust ring 216 and/or the non-magnetic material between stator 214 and magnet rotor 206. Simultaneously, shuttle-rotor 203's rotational position is at any one of a number of discrete equilibrium rotational positions (gate positions) that are determined by multiple minima reluctance magnetic states that are associated with the alignment of rotor magnetic poles (or gate teeth) 230 and 232 with the stator teeth 226 and 228. These magnetic states are commonly referred to, by electric motor practitioners, as motor "cogging," or more formally as "detent torque." Cogging can be experienced by hand rotating the shaft any small permanent magnet stepper motor and noting angular "catchings" as the motor is rotated. This detent torque benefits the device by holding the shuttle-rotor 206 in FIG. 6 at a stationary rotational angle, even under small mechanical disturbances or when a small spurious fluid flow passes through the valve.

Fluid volume through the valve is intended to be adjusted under the condition when no fluid is flowing from inlet port 205 to outlet port 207 and when no fluid pressure is applied by external means to the inlet port 205. Flow adjustment is made by applying appropriate phase and magnitude electrical current waveforms to winding phases 215 of the motor stator, resulting in an electromechanical force that rotates the shuttle-rotor 203 to a chosen discrete angular position. This means of electrically controlling a stepper motor is well known and established by prior art and is not further discussed.

When the shuttle-rotor 203 is electromechanically rotated with respect to the valve body conduit 204, it slides on thrust ring 216 and rotor gates 210 rotate with respect to body gate modulation orifices 221, acting as a fluid gating mechanism, and adjusting the effective valve orifice opening between the valve inlet and outlet ports 205 and 207. Under such adjustment, the gates 210 and 221 overlap each other at discretely variable positions (gate positions) between zero overlap to full overlap, the latter of which corresponds to a maximum flow. Again, valve adjustment takes place when zero differential pressure exists between inlet and outlet ports 205 and 207, thus minimizing pressure-induced normal forces upon valve components and allowing the shuttle-rotor 203 to be moved with a very small applied force and energy.

When controlled to allow a working fluid pressure at the valve inlet port 205, fluid enters the valve, impinges upon the shuttle-rotor 203, assists actuation in moving the rotor to close gap 222, and pushes rotor head 202 against body seal 220 and gasket 223 into an equilibrium gate hydraulic position. Inlet pressure holds the shuttle-rotor 203 and rotor gates 210 in an equilibrium gate hydraulic position, acting as a fluid gating mechanism and creating a fluid orifice of desired area at the overlap of rotor and body gate modulation orifices 210 and 221 so as to control the fluid volume passing between valve inlet and outlet ports 205 and 207.

When control is applied to remove fluid pressure, the magnetic attraction between the magnet rotor poles (gate teeth) 230 and 232, and stator teeth 226 and 228 is assisted by such pressure removal in maintaining the current rotational position and pulls the shuttle cap 208 back to its rest equilibrium gate position on thrust ring 216.

Figure 10:
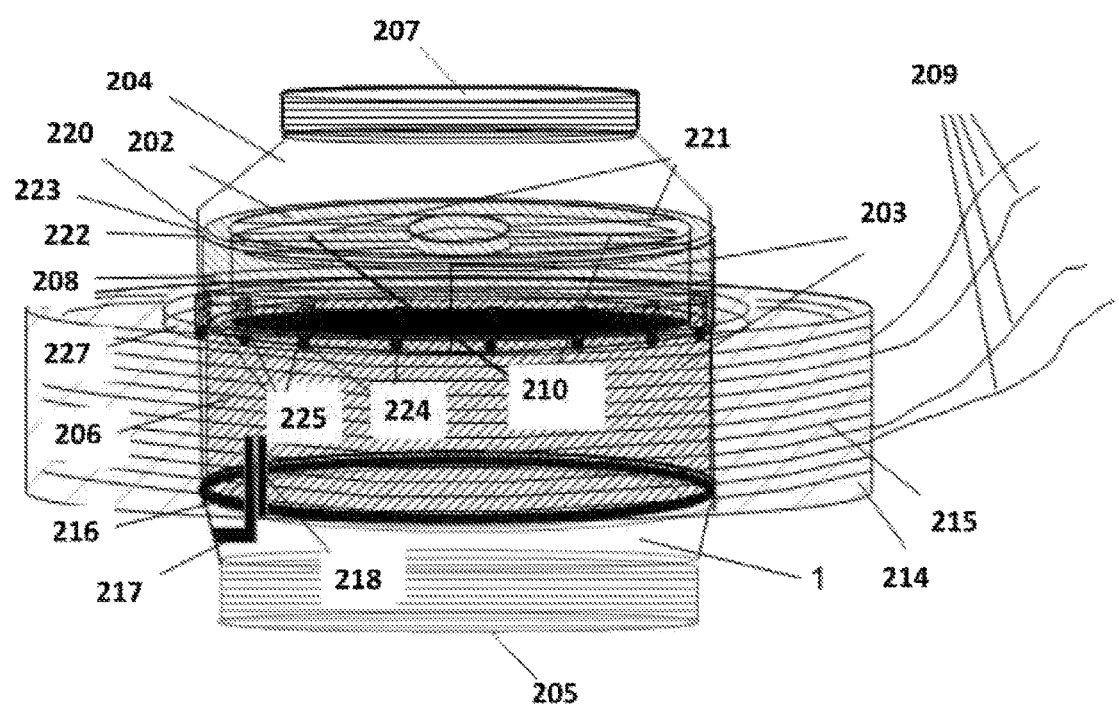
FIG. 10 shows a view of a step throttling MAV embodiment with guide beads.

Description—Second MAV Embodiment—FIG. 10

Another embodiment of a modulation assisted valve (MAV) FIG. 10 is similar in operation and construction to the MAV in FIG. 6-FIG. 9 but has the addition of a one or more guide beads 224 to aid in holding steady the shuttle-rotor 203 in a hydraulic gate position under the disturbing influences of fluid moving through the valve 1. The guide beads are attached at one or more angular positions and protrude slightly from the outer cylinder of the shuttle-rotor 203. The guide beads rest inside a bead race 227, which is a circumferential groove that is cut into the inner cylinder wall of the valve body conduit 204. Guide grooves depressions 225, having a vertical extent just greater than gap 222; exist at sequential angular positions on the inner cylinder wall of the valve body conduit.

Operation—Second MAV Embodiment—FIG. 10

The embodiment of FIG. 10, operates in a manner that is, in most respects, the same as the step throttling MAV of FIG. 6-FIG. 9. However, when fluid pressure is controlled to enter the inlet port 205, the shuttle-rotor 203 is assisted by such pressure to rise vertically from its initial rest gate position while the guide beads 224 engage the guide grooves 225 and then hold the shuttle-rotor 203 in at definite constant rotational angle hydraulic position with respect to the valve body conduit 204. At rest (fluid pressure controlled to be removed at inlet port 205), the shuttle-rotor assembly 203 may be rotated to multiple gate positions with respect to the valve body conduit 204 by appropriate energization of stator windings 215 in a manner analogous to the step throttling MAV (FIG. 6-FIG. 9). When rotated in the latter state (controlling pressure across the valve to be zero), guide beads 224 can be moved, with little friction, horizontally in bead race 227.

Figure 11:
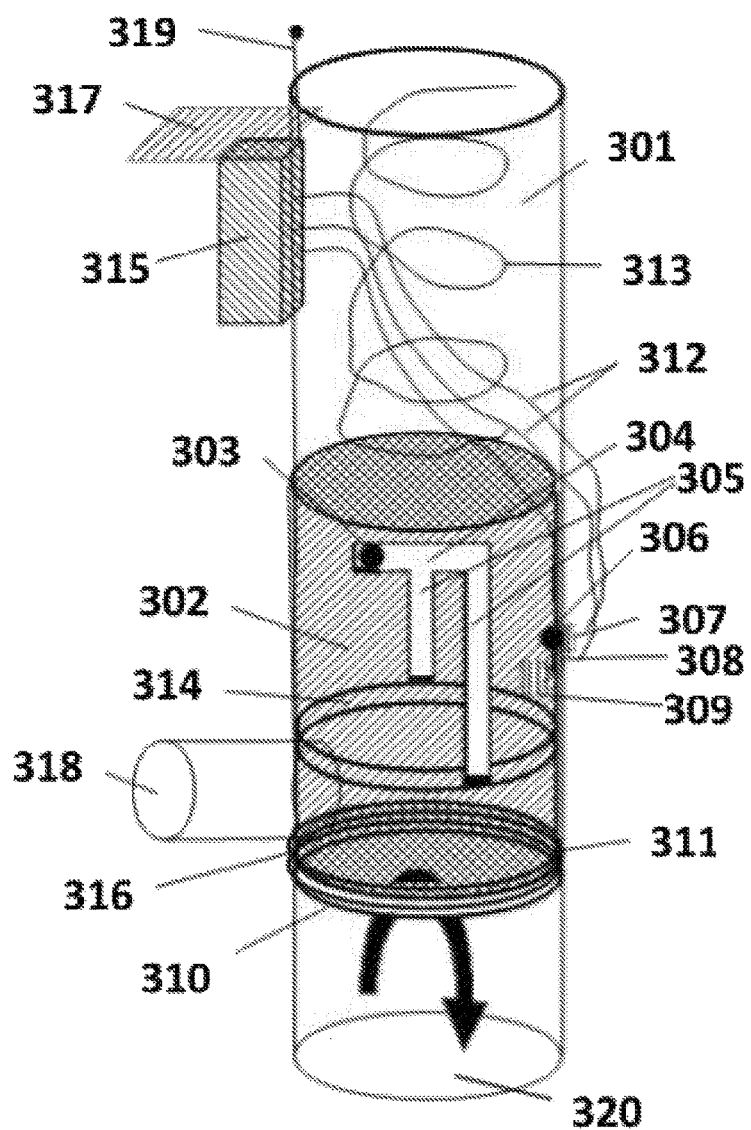
FIG. 11 shows a drawing of a piston MAV embodiment of a modulation assisted valve in closed position.
Figure 12:
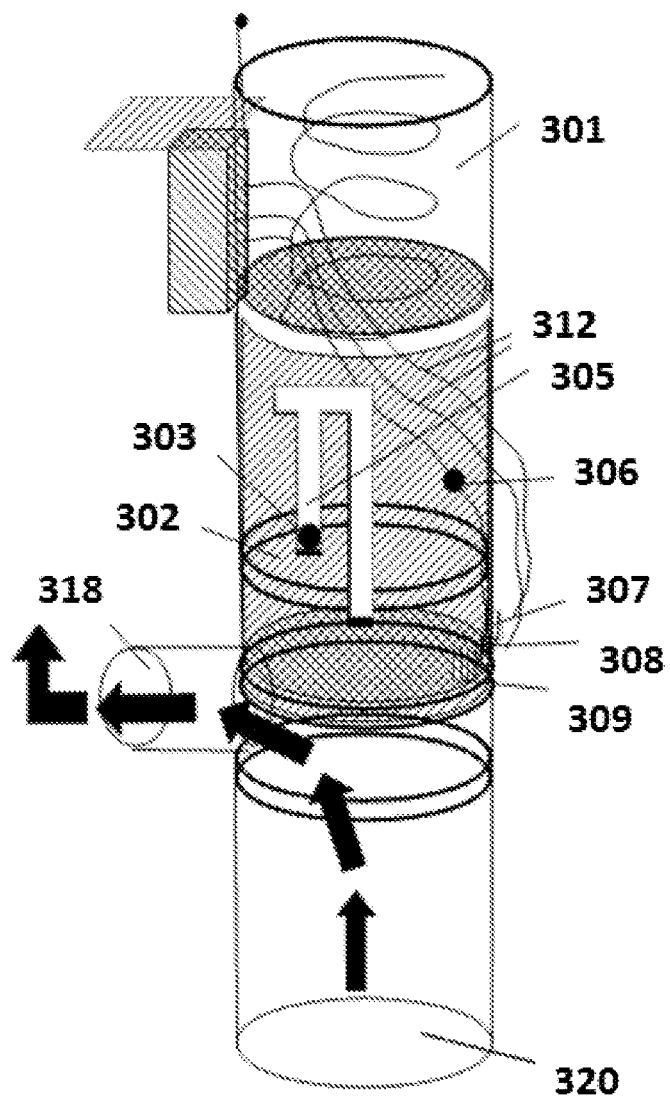
FIG. 12 shows a drawing of a piston MAV embodiment of a modulation assisted valve in open position.

Description—Third MAV Embodiment—FIG. 11-FIG. 12

A third embodiment of a modulation assisted valve (MAV) is shown in FIG. 11 and FIG. 12. This embodiment might be called a piston MAV. FIG. 11 shows the piston MAV in the "off" or "closed" state with a piston 302 sitting at its lowest position in a valve body cylinder conduit 301. Referring to FIG. 11, the piston MAV has an inlet port 320 and an outlet port/modulation orifice 318. A moveable piston 302 resides within a cylinder conduit 301. The piston 302 (gating mechanism) is a thin-walled hollow circular cylinder of finite extent. In its side is imposed a horizontal top track groove 304 and a plurality of vertically oriented guide grooves 305. One or more guide beads 303 are fixed to the body cylinder conduit 301 and rest loosely inside of the top guide track 304. One or more permanent magnets (gate teeth) 306 are fixed to the exterior wall and flush with the cylinder conduit external surface 302. Both the top and bottom ends of cylinder 302 are closed surfaces.

Fixed to the outside of the valve body cylinder conduit are a plurality of magnet wire stator coil windings, 307, 308, and 309 that can also be considered to be stator "teeth". Winding 307 is herein termed the "off" stator coil winding, 308 is termed the "½ on" stator coil winding, and 309 is termed the "full on" stator coil winding. However, more stator coil windings may be similarly added, in which case additional windings would be termed, for instance, "⅛ on" stator coil winding, "¼ on" stator coil winding, etc., and correspond to the proportional flow setting of the valve device. Attached to the stator coil windings are a means of accepting electrical energy in the form of a plurality of electrical coil winding leads 312.

A thrust ring 310 of low friction material such as PTFE is fixed to the interior wall at the very bottom of the body cylinder conduit 301. When no fluid pressure is applied to the inlet port of the valve 320, the piston 302 rests upon the thrust ring 310 by the assistance of gravity, an optional return spring 313, and/or passive magnetic forces between magnets 306 and ferromagnetic winding spools 307, 308, 309 . . . etc.

A piston seal ring 311 is fixed to the outer surface of the piston 302. The seal ring 311 is envisioned to be of the "parachute" seal type that imposes minimal normal force onto the wall of cylinder conduit 301 under zero pressure, but expands to form a tight seal when fluid pressure is introduced at the inlet port 320. In the body cylinder conduit 301, positioned below the outlet port/modulation orifice 318, is a recessed or beveled circumferential depression 316 that is cut into the interior cylinder conduit wall 301. When the valve is unpressurized the piston seal ring 311 rests loosely in the beveled area, allowing the entire piston 302 to rotate freely on thrust ring 310.

Top seal ring 314, similar in all respects to seal ring 311, is fixed to the outer surface of piston 302 above outlet port/modulation orifice 318. Top seal ring 314 also rests in a beveled circumferential recess of cylinder conduit wall 1 when the valve is in the zero-pressure state. Electronics housing 315 (containing microcontroller, radio transceiver, and super capacitor or lithium-ion capacitor, and ancillary electronics), solar panel 317, and antenna 319, and irrigation sprinkler head, are not necessary for the completeness of this valve invention and are shown only for context and as one motivation for the pursuit of the present invention.

The black block arrow near the inlet port 320 in FIG. 11 is not a physical part of the device structure, but is shown only to illustrate fluid pressure being "turned back" when the valve is in the closed position.

FIG. 12 is similar to FIG. 11 except that FIG. 12 shows the piston MAV in the "½ on" state and pressurized fluid entering at the inlet port 320. In FIG. 12, note the position of guide bead 303 in relation to guide groove 305 and the vertical and rotational position of permanent magnet gate tooth 306 in relation to stator coil windings (stator teeth) 307, 308, and 309 and valve body 301. Also note the position of the bottom of piston 302 in relation to the outlet port/modulation orifice 318. The piston is in a raised state, allowing fluid (indicated by black block arrows) to enter inlet port 320 and exit through outlet port/modulation orifice 318.

Operation—Third MAV Embodiment—FIG. 11-FIG. 12

The third embodiment (herein referred to as a piston MAV), FIG. 11-FIG. 12, has a piston gating mechanism and cylinder type of valve. In the off gate position (controlled to be exposed to zero-pressure, i.e. the rest state) of FIG. 11, piston 302 comes to rest upon thrust ring 310 by force of some or all of the passive magnetic "cogging" torque attraction of magnet 306 to ferromagnetic winding spools 307, 308, and lead wires 309, gravity, the force of return spring 313, and/or by assistance of controlled removal of pressure from the valve. Passive magnetic cogging torque tends to hold the piston 302 at a constant rotation angle gate position with respect to the body cylinder conduit 301 even under small mechanical disturbances. In this rest state, seal rings 311 and 314 expand loosely into beveled recesses 316 (similar for 314) and apply, effectively, zero normal force between piston 302 and cylinder conduit walls. A minimal amount of friction still exists between the bottom of the piston 302 and thrust ring 310. Lead wires 312 act as a means of accepting electrical energy by which selective electrical current energization of various magnitudes and polarities through combinations of coils 307, 308, 309 (or a plurality of potentially more coils) electromechanically rotate piston 302 to a desired angular position with respect to valve body cylinder conduit 301 by magnetic attraction of magnet 306 to stator coil windings 307, 308, and/or 309. The extent of this rotation is allowed and limited in range by the sliding of guide bead 303 in top guide track 304. The electrical current energy required for rotation is sourced and controlled externally from the piston MAV, but is expected to derive from a super capacitor, lithium-ion capacitor, or battery that is charged by a solar cell or other electrical energy harvesting device. The electrical current waveforms are variously sequenced and are directly analogous to stepper-motor drive waveforms that are very common in prior art and industry and will not be further discussed herein. These waveforms are expected to be controlled by a microcontroller and ancillary electronics 315 which are external to the present invention.

After setting the rotational gate position of piston 302 with respect to cylinder conduit 301 under controlled zero inlet pressure, fluid pressure may be then be applied to inlet port 320 (from an externally controlled source), at which point, pressure against the bottom of piston gating mechanism 302, raises it to a hydraulic gate position at height that is determined by the length of one of guide grooves 305, thus opening, or partially opening outlet port/modulation orifice 318 (see FIG. 12) an amount that is essentially proportional to the length of same groove 305. The flow path of fluid through the piston MAV in the "½ on" state is illustrated by the black block arrows of FIG. 12.

Figure 13:
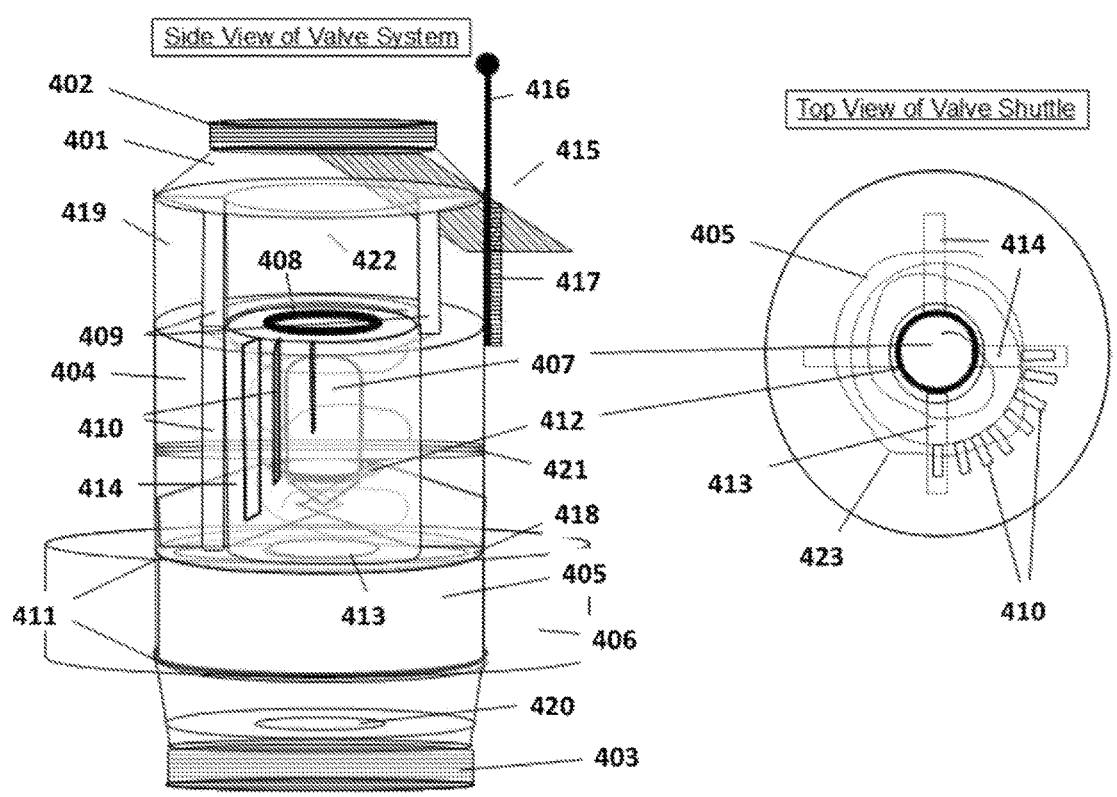
FIG. 13 shows a side and top view drawing of a torpedo MAV embodiment of a modulation assisted valve.
Figure 14:
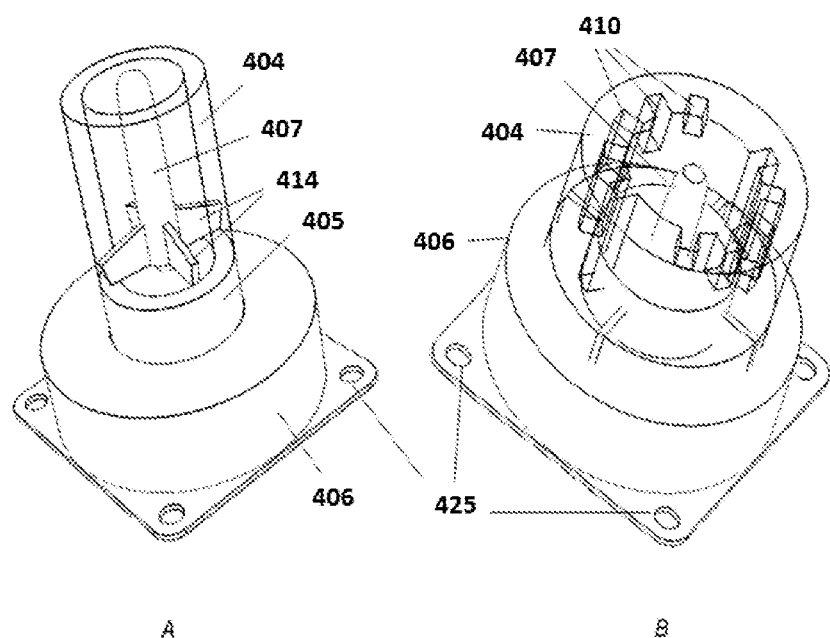
FIG. 14 shows a dual exploded view of a torpedo MAV embodiment.

Description—Fourth MAV Embodiment—FIG. 13-FIG. 14

FIG. 13 (left and right) and FIG. 14 show a fourth embodiment of a modulation assisted valve (MAV) which we might refer to as a "torpedo" MAV. In FIG. 13, left, is shown the valve body conduit cylinder 401 which is typically made of a plastic such as PVC or ABS. Valve inlet 403 and outlet 402 ports are shown with pipe threads at the top and bottom of the valve body conduit 401 (threads are unnecessary/ancillary). Inserted into the center of the valve body conduit 401 is an annular cylindrical shuttle 404 gating mechanism that is hollow in the center (so as to allow for fluid flow) except for having a protrusion, herein referred to as an orifice torpedo 407 that is attached at the bottom of the shuttle by a plurality of torpedo support vanes 414. Thus, the shuttle 404 is like a thick-walled tube with a torpedo protrusion 407 of some length at its center, around which fluid is allowed to flow. The outer ring volume of the shuttle 404 may also enclose air to aid in flotation. FIG. 13, right, is another view of shuttle 404 from the top showing torpedo 407 at its center with support vanes 414 integrally connecting torpedo 407 to shuttle 404. The shuttle rests on a rotor of hard or soft magnetic material which is referred to as the magnet rotor 405. The magnet rotor 405 is an annular cylinder such that fluid may pass through its center, and is currently expected to be a ceramic stepper-motor magnet having a plurality of hard magnetic poles (herein also playing the role of gate teeth) distributed radially around its circumference. Soft magnetic material with rotor "teeth" might also be used for the rotor 405 (such as that used in reluctance stepper motors), or any other (stepper or non-stepper) electric motors, or a hybrid of these (such as in a hybrid variable reluctance stepper motor) or any other form of electric motor rotor that is enclosed within the working fluid of the valve. Not shown in the figure, but understood, are stepper motor lead wires that act as a means of accepting electrical energy to energize the stepper motor coils. The magnet-rotor 405 is retained loosely in its axial position in the valve body conduit by low friction glide rings 411. An electric motor stator 406 (with magnet wire windings), envisioned to be of a can-stack stepper motor type for the torpedo MAV, surrounds the valve body 401 and is isolated from the working fluid and the rotor 405 by a very thin layer of plastic or epoxy, or some other non-magnetic "air gap" material. As motor stator 406 is envisioned to be a stepper motor, like the first MAV embodiment herein (step throttling MAV), implied and known to persons of ordinary skill in the art, are stator teeth, coil wires, and other common electric motor parts. The bottom of the shuttle 404 is closed except for a shuttle orifice 413 of a predetermined diameter.

At the top of the valve body conduit 401, is an upper valve chamber 422 that is fluidly separated from the shuttle 404 region of the body 401 except for a modulation orifice/valve seat 408 through which the torpedo 407 is allowed to move. The radius of the upper chamber 422 is slightly smaller than the inner annular radius of the shuttle 404, so that the latter may slide up and around the chamber 422 and into a recessed area 419 in the upper part of the valve body conduit 401. Upon such sliding shuttle 404 acts as a gating mechanism for fluid flow, while torpedo 407 moves upward into orifice 408, partially obscuring and effectively decreasing the cross-sectional area of orifice 408. The higher the torpedo 407 is moved into orifice 408, the more orifice 408 is obscured. At its maximal height position, torpedo 407 fully obscures/closes orifice 408 and seat ring 412, which is attached near the bottom of the torpedo 407, is pressed against orifice 408 creating a fluid-tight seal.

In FIG. 13 are also shown shuttle guide rails 409 which are integrally attached to the valve body conduit 401 and to the upper chamber wall 422. At particular rotational angles around the inner annular circumference of shuttle 404 are or two more indented guide grooves 410. The plurality of guide grooves 410 have increasing length such that the vertical travel of shuttle 404 is limited by the length of said grooves by virtue insertion of guide rails/stops 409 into guide grooves 410. The limit of vertical travel of shuttle 404 is dependent upon the rotational angle of the shuttle 404 and which of the guide grooves 410 lines up with the rotational position of guide rails 409. Guide rails 409, when inserted into grooves 410 also hold the shuttle 404 at a constant rotational position with respect to valve body conduit 401.

Magnet-to-shuttle gear teeth 418 may also be useful for ensuring rotational torque is applied without slippage between the rotor 405 and shuttle 404, but is currently not thought necessary.

Also currently thought useful but not essential, are the "water hammer" reduction orifice 420, body access threads 421, and return spring 423.

FIGS. 14 A and B show similar perspective views of the torpedo MAV from an, as yet, unfinished CAD drawing. In that figure, items 425 (motor mounts) are not part of this torpedo MAV but are artifacts of the CAD capture of an existing stepper motor device from which the torpedo MAV was to be prototyped.

Operation—Fourth MAV Embodiment—FIG. 13-FIG. 14

In a fourth embodiment of a modulation assisted valve (MAV) as shown in FIG. 13-FIG. 14, the valve is initially under the condition where fluid pressure is controlled such that no pressure differential exists between the inlet and outlet ports, 403 and 402, of valve body conduit 401. The shuttle 404 rests in a gate position at the bottom of its travel and upon magnet rotor 405. An electric current waveform (such as is used with any electric motor) may be applied by an external means of applying electrical energy to stator windings phases 406, rotating rotor 405 on low-friction retainer rings 411, to any one of a number of prescribed angular gate positions with respect to valve body conduit 401. Shuttle 404 is also rotated by friction with rotor 405 or by engagement with optional guide teeth 418. In the resulting rotational gate position, one, common-length set, of guide grooves 410 aligns with guide rails 409.

When fluid pressure is then controlled to be admitted at valve inlet 403, shuttle 404 acts as a gating mechanism for fluid flow and is assisted by this pressure to be moved into a gate hydraulic position at the recessed area 419 of the valve body conduit. The shuttle 404 simultaneously engages guide rails 409 with its own guide grooves 410, being stopped in its vertical travel at the equilibrium hydraulic gating position by the end of the particular guide groove 410. At this particular distance of vertical travel, torpedo 407 is partially (or wholly or none, depending on the length of particular guide groove) inserted into orifice 408, preferentially restricting the flow of the pressurized fluid. As the torpedo 407 has a radius that changes in a predetermined way along its axial length, a chosen quantity of obscuration of orifice 408 is associated with magnitude of the torpedo insertion distance. In this way, the torpedo modulates the fluid flow rate through orifice 408. When the fluid pressure is controlled to be removed, shuttle 404 remains at a constant rotational angle while either gravity, the return spring 423, or flotation forces move the shuttle 404 axially back to its rest gate position on rotor 405. In this way the valve is able to control the volume fluid between inlet port 403 and outlet port 402.

Figure 15:
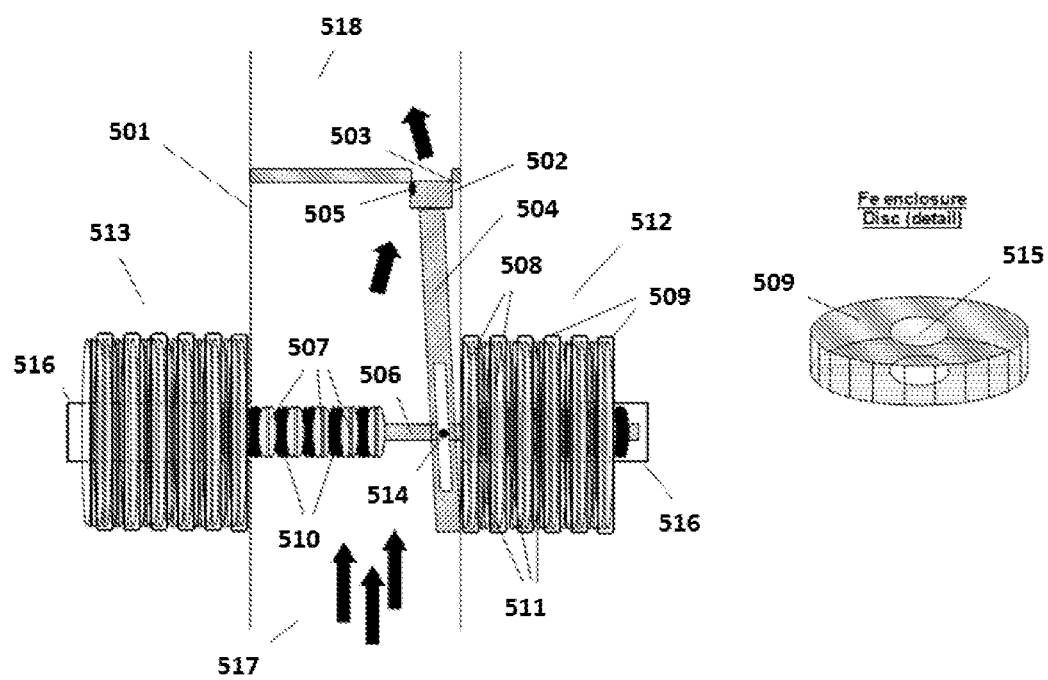
FIG. 15 shows a side and top view drawing of a levered solenoid MAV embodiment of a modulation assisted valve.

Description—Fifth MAV Embodiment—FIG. 15

A fifth embodiment of a modulation assisted valve (MAV) is shown in FIG. 15 and serves to illustrate the breadth of the present invention. This embodiment might be called a levered solenoid MAV. The valve in whole is shown at the left side of the figure, and a detail of a part (the ferromagnetic enclosure 509) is shown at the right side. In this levered solenoid MAV, the valve body pipe 501 is shown with inlet and outlet ports 517 and 518. A valve head 502 is shown obscuring a modulation orifice/valve seat 503. The valve head 502 is connected to a valve lever 504. A clevis pin 514 is inserted through a rectangular hole in valve lever 504 and loosely connects it to a push rod rotor 506. Together, 502, 504, 505, and 514 behave as a gating mechanism for fluid flow. Also, here, the term "rotor" is used as a traditional electromagnetic machine term event though the push rod rotor 506 is linearly shaped and moves in a linear and not a rotary fashion. A hinge 505, with a loose elliptical axis hole, allows the valve head 502 to pivot about said hinge, while allowing some loose vertical translation of said valve head at said hinge axis, such that fluid pressure may further hold or seal the valve to a hydraulic gate position.

Around the cylindrical rod 506 are fixed alternating groups of axially magnetized ring magnets (gate teeth) 507. The ring magnets are oriented in a north-to-north, south-to-south fashion and may be interspersed with "air gap" washers to set the magnetic, north-to-south, cyclical period length of the assembly. The assembly consisting of rod 506, magnets 507, and washers 510 is "wet"; immersed in the valve working fluid, and able to move freely in magnet cylinders 516. Magnetic "air gaps" for this motor are not filled with air but, in fact, are filled with the working fluid of the valve. This fact obviates the need for valve stems and packings thus largely reducing frictional forces and actuation energies. Around cylinders 516, on either side of the valve, a "phase A" and "phase B" part of the motor stator can be found. Phase A 512 and phase B 513 stators have a plurality of independent magnet wire coil windings 508 wound around the non-ferromagnetic cylinder 516 at periodic distances so as to match the period defined by rod magnets (gate teeth) 507. Each of the coils 508 are enclosed by a ferrous metal enclosure 509, which can also be called a stator "tooth" (pl. "teeth"), that is further detailed at the right side of FIG. 15. The right side of FIG. 15 shows both the ferromagnetic enclosure 509 and the magnetic flux "air gap" 515 in the center of the enclosure where magnetic flux may flow into magnets 507 inside of cylinder 516. All coils 508 of phase A can be simultaneously energized with electric current by a single bipolar lead wire (means of accepting electrical energy are not shown but implied to any person having ordinary skill in the art) while all coils 508 of phase B can be independently energized with electric current by a single phase B bipolar lead wire (again, not shown, but understood). A means of control of such electric current is outside the scope of this levered solenoid MAV but is well understood by practitioners versed in the use of linear actuators or linear stepper motors.

The combination of parts 506, 507, and 510 while enclosed in working fluid of the valve conduit by means of cylinders 516, and in combination with 508, 509, 510, and 511 constitute one means of arranging a motor by which the present invention greatly reduces valve actuation forces (particularly eliminating the friction that is associated with a valve packing) by their enclosure within the valve conduit (and immersion in the working fluid).

Operation—Fifth MAV Embodiment—FIG. 15

The operation of the levered solenoid MAV typically starts by controlling the pressure between inlet and outlet ports, 517 and 518 to be zero, in the valve of FIG. 15. A polarized current waveform of sufficient magnitude and that is directly analogous to waveforms used to drive rotary permanent magnet stepper motors, is applied to phase A 512 and to phase B 513 coils 508 and shaped by winding enclosures 509 (stator teeth). The application of such a waveform applies mechanical force to rod 506 through magnets (gate teeth) 507, moving rod 506 right or left in steps a desired distance. This lateral motion forces lever 504 to pivot about hinge 505, and moves valve head 502 to a commanded gate position. Passive magnetic forces (without electrical current flowing) hold lever 504 stationary in this commanded gate position. When fluid pressure is controlled to be admitted at valve inlet 517, the volumetric flow through orifice 503 is directly related to the commanded gate position of lever 504. In the case where lever 504 has been commanded to the closed gate position (as is the state in FIG. 15) pressure admitted at inlet port 517 impinges upon valve head 502, assisting it to move vertically inside of the elliptically shaped hinge 505 to be sealed by pressure to an equilibrium hydraulic gate position against orifice seal 503.

If electric current, magnets 507, and coil windings, 508 of a sufficient magnitude are used, this levered solenoid MAV might be operated under a nonzero differential fluid pressure between inlet port 517 and outlet port 518.

Note: in this patent application, the terms rotor and stator refer to the moving and stationary parts, respectively, of an electromechanical motor. Thus electromechanical motors known as linear motors do, in fact, often have an element called a rotor even though such a rotor is of linear shape and moves with linear, and not necessarily rotary, motion. Also the term magnetic gap is also intended to mean any gap in a magnetic circuit that plays the role of the more traditional "air gap" in a magnetic circuit. The magnetic gap could, in fact, could be water, plastic, oil, or other substances that play the role of the traditional "air gap" in electromagnetic machines.

Figure 17:
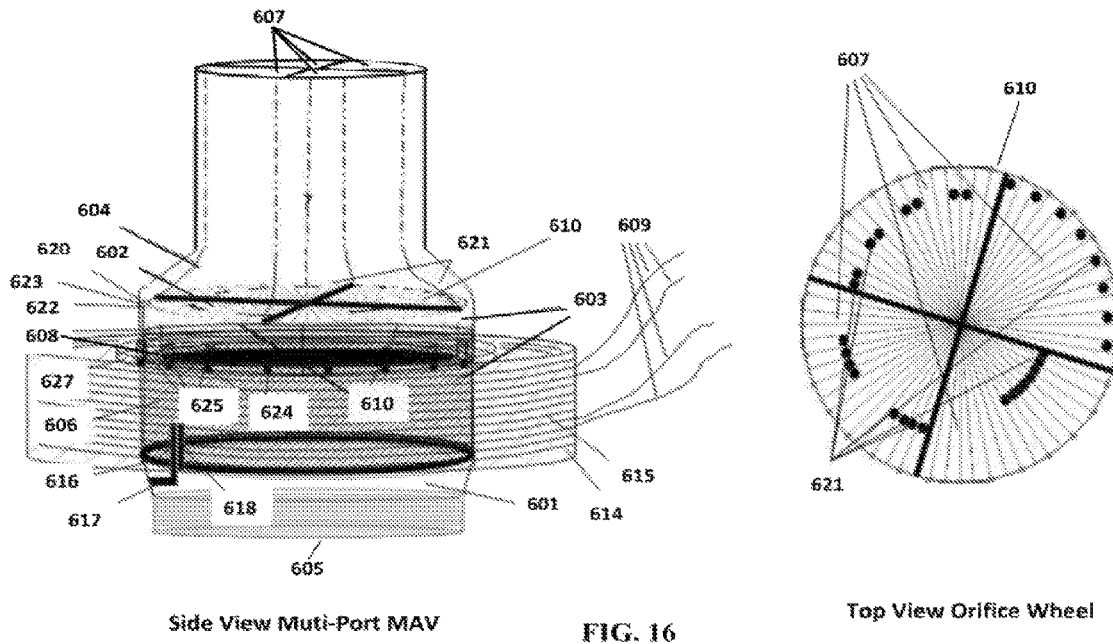
FIG. 17 is a table showing the flow states versus angle for the multi-port MAV, DRAWINGS - Reference Numerals 1 modulation assisted valve (MAV) component (here, the step throttling MAV)
2 solenoid valve (means of modulating the flow or differential pressure across valve)
3 valve radio frequency transceiver [symbol] (means for the valve to communicate and accept a command)
4 radio frequency equipped soil moisture monitors
5 radio frequency command unit for controlling process of irrigation
6 network of pipes
7 radio equipped solenoid valve controller
8 Internet hosted data and communications infrastructure
9 solenoid controller radio frequency transceiver (means of accepting commands to modulate pressure or flow of fluid)
10 energy harvesting modulation assisted valve (MAV) with flow settings
11 to pressurized irrigation water supply
100 (cutaway view window, CAD artifact)
102 water inlet port
103 plastic spray nozzle
105 photovoltaic array
106 super capacitor or lithium-ion capacitor energy storage
107 microcontroller and electronics package
108 RF transceiver
109 RF antenna
110 power and data bus wires
111 electronics potting/molding enclosure
112 sprinkler riser
113 return spring
114 riser piston
115 antenna "keep out" region
116 ground level
117 USB cover/adapter
202 rotor head
203 shuttle-rotor (gating mechanism)
204 body conduit
205 inlet port
206 magnet rotor
207 outlet port
208 shuttle cap DRAWINGS - Reference Numerals 209 lead wires (means of accepting electrical energy)
210 rotor gates
214 motor stator
215 windings
216 thrust ring
217 reset stop
218 rotor stop
220 body seal
221 body gate modulation orifices
222 gap
223 gasket
224 guide beads
225 guide grooves
226 north stator teeth
227 bead race
228 south stator teeth
230 magnet north poles (gate teeth)
232 magnet south poles (gate teeth)
301 cylinder conduit
302 piston (gating mechanism)
303 guide bead (fixed to cylinder conduit wall)
304 top guide track
305 guide grooves
306 permanent magnet gate tooth (or ferromagnetic material)
307 "off" stator coil winding
308 "½ on" stator coil winding
309 "full on" stator coil winding
310 thrust ring
311 piston seal ring
312 coil winding leads (means of accepting electrical energy)
313 return spring
314 top seal ring
315 electronics housing (microcontroller, radio transceiver, super capacitor or lithium-ion capacitor)
316 cylinder bevel
317 solar cell (or other energy harvesting transducer)
318 outlet port/modulation orifice
319 radio antenna
320 valve inlet port
401 valve body conduit
402 outlet port (shown with pipe threads)
403 inlet port (shown with pipe threads)
404 shuttle (gating mechanism)
405 ceramic magnet stepper motor rotor (wet)
406 stepper motor stator (dry)
407 orifice torpedo gate
408 modulation orifice/valve seat
409 shuttle guide rails/stops
410 graduated length guide grooves
411 low friction glide rings/retainers
412 seat ring
413 shuttle orifice
414 torpedo support vanes
415 solar cell
416 RF antenna
417 microcontroller, radio, super capacitor or lithium-ion capacitor, ancillary electronics
418 magnet-to-shuttle guide teeth
419 recessed area (void)
420 "water hammer" reduction orifice
421 access threads/seal
422 upper valve chamber
423 return spring
425 (not applicable. Artifact of literal CAD capture of existing stepper motor hardware)
501 pipe cylinder conduit
502 valve head (gating mechanism)
503 modulation orifice/valve seat
504 lever
505 hinge
506 push rod rotor
507 axially magnetized ring magnets (gate teeth)
508 enclosed magnet wire coils -continued DRAWINGS - Reference Numerals 509 ferromagnetic winding enclosures (stator teeth)
510 "air gap" rod washers
511 "air gap" shell washers
512 phase "A" linear motor stator assembly
513 phase "B" linear motor stator assembly
514 clevis pin
515 magnetic flux "air gap"
516 magnet cylinders
517 inlet port
602 rotor head
603 shuttle-rotor (gating mechanism)
604 body conduit
605 inlet port
606 magnet rotor
607 multiple outlet ports (independent flow quadrants)
608 shuttle cap
609 lead wires (means of accepting electrical energy)
610 rotor gates
614 motor stator
615 windings
616 thrust ring
617 reset stop
618 rotor stop
620 body seal
621 body gate modulation orifices (orifice wheel)
622 gap
623 gasket
624 guide beads
625 guide grooves
627 bead race
518 outlet port

Description—Sixth MAV Embodiment—FIG. 16-FIG. 17

Another embodiment of an MAV is shown in FIG. 16, and can be called a multi-port MAV. This embodiment uses a cylindrical actuator that is similar to the cylindrical actuator used in the step throttling embodiment of an MAV (FIG. 6). The multiple outlet ports 607 make the embodiment multi-ported, with four outlet port conduits shown in the FIG. 16. An orifice wheel that takes on a shape of a "pinwheel" arranged set of body gate modulation orifices, which take the place of body gate modulation orifices 221 of FIG. 6 are arranged around the body seal of outlet ports 607. Further, the outlet port is divided into a plurality of independent flows (with four quadrants shown in this embodiment) 607, each respectively associated to each of four quadrants on the orifice wheel. In the present embodiment, the shuttle-rotor would have a single rotor gate orifice 610 for each independent outlet port 607, which would replace the rotor gates 210 of FIG. 6.

Operation—Sixth MAV Embodiment—FIG. 16-FIG. 17

The embodiment would operate in a manner similar to FIG. 6, except that each discrete angular position 610 of the pinwheel would correspond to a binary combination of on or off flows in each of the independent outlet ports 607. For example, an initial position of the pinwheel in FIG. 16 would block all flows at all outlet ports as none of the four rotor gates 610 would align and overlap with any of the pinwheel body gate orifices 621. With a slight rotation, only the first rotor gate 610 would align with the first body gate orifice 621, enabling flow only out of the first outlet port 607. The second position would allow flow only out of the second port 607, etc., and the final position would allow flow out of all four outlet ports 607. In the illustrated embodiment, the pinwheel positions corresponding to quadrant 607 flows follow a common binary number progression of individual flow quadrant on/off states. If a 1 denotes an outlet port 607 quadrant being on and a 0 denotes its off state, then the table of FIG. 17 shows the on/off states of each of the four outlet ports 607, or quadrant, for each angular position of the rotor-shuttle 603 (and rotor gates 610).

What is claimed is:

1. A process of controlling a remote valve in a network of pipes, the process comprising:
    a. ensuring that said remote valve is installed in said network of pipes;
    b. ensuring that characteristics of said remote valve comprise:
        i. having two or more flow settings;
        ii. having a command receiver, said command receiver being a means for receiving commands to electromechanically actuate said remote valve between a first of said two or more flow settings and a second of said two or more flow settings;
        iii. having a threshold actuation pressure, said threshold actuation pressure defining a total fluid pressure imposed across said remote valve equal to or below which said remote valve possesses an ability to be electromechanically actuated from said first of said two or more flow settings to said second of said two or more flow settings while above said threshold actuation pressure said remote valve lacks said ability to be electromechanically actuated from said first of said two or more flow settings to said second of said two or more flow settings;
    c. ensuring that a means of modulating pressure in said network of pipes is installed in said network of pipes;
    d. ensuring that said means of modulating pressure is in fluid communication with said remote valve;
    d. ensuring that an electronic control system is enabled to command said means of modulating to modulate said total fluid pressure imposed across said remote valve;
    e. ensuring that said electronic control system is in communication with said command receiver of said remote valve;
    f. using said electronic control system to effect an ordered sequence of sub-steps comprising:
        i. commanding said means for modulating to set said total fluid pressure imposed across said remote valve to be less than or equal to said threshold actuation pressure with the intent of enabling the electromechanical actuation of said remote valve from said first of said two or more flow settings to said second of said two or more flow settings;
        ii. commanding said remote valve to actuate from said first of said two or more flow settings to said second of said two or more flow settings while said total fluid pressure imposed across said remote valve is less than or equal to said threshold actuation pressure;
    whereby said actuation of said remote valve is assisted by said pressure modulation.

2. The process of controlling a remote valve as in claim 1, wherein said step of ensuring that a means of modulating pressure in said network of pipes is installed in said network of pipes is ensuring that a modulating valve is installed in said network of pipes.

3. The process of controlling a remote valve as in claim 2, wherein said step of ensuring that a modulating valve is installed in said network of pipes is ensuring that a valve having an on setting and an off setting is installed in said network of pipes.

4. The process of controlling a remote valve as in claim 1, wherein said step of ensuring that said electronic control system is in communication with said command receiver of said remote valve is ensuring that said electronic control system is in radio frequency communication with said command receiver of said remote valve.

5. The process of controlling a remote valve as in claim 4, further comprising the step of ensuring that said remote valve is configured to deliver fluids for the cultivation of plants.

6. A system for controlling a remote valve in a network of pipes, the system comprising:
    a. one or more computers,
        said one or more computers defining a computer network,
        at least one of said one or more computers being configured with a means of communicating with a command receiver of said remote valve,
        said remote valve having two or more flow settings,
        said remote valve being installed in said network of pipes,
        said command receiver being a means for said remote valve to receive commands to electromechanically actuate said remote valve between a first of said two or more flow settings and a second of said two or more flow settings,
        said remote valve being further configured to have a predetermined threshold actuation pressure, said threshold actuation pressure defining a total fluid pressure imposed across said remote valve equal to or below which said remote valve possesses an ability to be electromechanically actuated from said first of said two or more flow settings to said second of said two or more flow settings while above said threshold actuation pressure said remote valve lacks said ability to be electromechanically actuated from said first of said two or more flow settings to said second of said two or more flow settings,
        at least one of said one or more computers being configured with a means of communicating with a means of modulating said total fluid pressure imposed across said remote valve in said network of pipes, at least one of said one or more computers being further configured to effect an ordered sequence of steps comprising:

i. commanding said means for modulating to set said total fluid pressure imposed across said remote valve to be less than or equal to said threshold actuation pressure with the intent of enabling said electromechanical actuation of said remote valve from said first of said two or more flow settings to said second of said two or more flow settings;

ii. commanding said remote valve to actuate from said first of said two or more flow settings to said second of said two or more flow settings while said total fluid pressure imposed across said remote valve is less than or equal to said threshold actuation pressure;

whereby said system assists in said actuation of said remote valve by coordinating said actuation with said modulation of said fluid pressure imposed across said remote valve.

7. A system as in claim 6, wherein said means of modulating is a pressure modulating valve.

8. A system as in claim 7, wherein said pressure modulating valve is a valve having an on setting and an off setting.

9. A system as in claim 6, wherein said command receiver is a radio frequency receiver.

10. A system as in claim 9, wherein said remote valve is configured to deliver fluids for the cultivation of plants.

11. An electronic valve for controlling fluids, the valve comprising:

a. at least one inlet port, said at least one inlet port having a means of being fluidly connected with a network of pipes;

b. at least one outlet port;

c. an electromechanically actuated gating mechanism disposed between at least one of said at least one inlet port and at least one of said at least one outlet port, said gating mechanism being for the purpose of throttling the flow of fluids between said at least one of said at least one inlet port and said at least one of said at least one outlet port, said gating mechanism having two or more flow positions, said valve further configured to have a predetermined threshold actuation pressure, said threshold actuation pressure defining a total fluid pressure imposed across said at least one of said at least one inlet port and said at least one of said at least one outlet port above which said gating mechanism is so configured as to be held electromechanically immovable between a first of said two or more flow positions and a second of said two or more flow positions due to resultant hydraulic forces acting upon said gating mechanism and below which said gating mechanism is so configured as to be electromechanically movable between said first of said two or more flow positions and said second of said two or more flow positions due to resultant hydraulic forces acting upon said gating mechanism;

d. a local electrical power supply, wherein said valve is disconnected from all external sources of electrical actuation power, said power supply being collocated with said valve, wherein source of power for said power supply is at least one selected from the group comprising a chemical battery, a photovoltaic array, an energy storage capacitor, and a hydroelectric generator, said hydroelectric generator being configurable to connect with and harvest hydraulic power from said network of pipes, said power supply being electrically connected so as to supply power for said electromechanically actuated gating mechanism;

e. a radio frequency receiver, said radio frequency receiver being collocated with said valve, said radio frequency receiver being in communication with said gating mechanism such that said radio frequency receiver is enabled to receive and relay actuation commands for actuating said gating mechanism.

12. The electronic valve of claim 11, wherein the type of said power supply is not an electrochemical battery, wherein said power supply further comprises said energy storage capacitor, said capacitor being electrically integrated with said power supply so as to store electrical energy generated within said power supply, thereby essentially obviating the need for said valve to use electrochemical batteries.

* * * * *